(12) United States Patent
Alexeev et al.

(10) Patent No.: US 8,707,252 B1
(45) Date of Patent: Apr. 22, 2014

(54) TECHNIQUES FOR AUTOMATIC GENERATION OF PARSING CODE

(75) Inventors: Sergey Alexeev, St. Petersburg (RU); Artem Zarafyants, St. Petersburg (RU); Alexander E. Timofeev, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 1293 days.

(21) Appl. No.: 12/231,477

(22) Filed: Sep. 3, 2008

(51) Int. Cl.
*G06F 9/44* (2006.01)
*G06F 9/45* (2006.01)

(52) U.S. Cl.
USPC ............ 717/106; 717/104; 717/136; 717/143

(58) Field of Classification Search
USPC .................................................. 717/143, 106
See application file for complete search history.

(56) References Cited

U.S. PATENT DOCUMENTS

| | | | |
|---|---|---|---|
| 5,649,215 A | 7/1997 | Itoh | |
| 6,330,529 B1 | 12/2001 | Ito | |
| 6,675,370 B1 | 1/2004 | Sundaresan | |
| 6,714,905 B1 | 3/2004 | Chang et al. | |
| 7,908,594 B2 * | 3/2011 | Varanasi et al. ............. 717/136 |
| 2002/0085696 A1 * | 7/2002 | Martin et al. ............ 379/201.03 |
| 2006/0013217 A1 * | 1/2006 | Datla et al. ..................... 370/389 |
| 2007/0006179 A1 * | 1/2007 | Tjong et al. .................... 717/136 |
| 2007/0006196 A1 * | 1/2007 | Tjong et al. .................... 717/151 |
| 2007/0169008 A1 * | 7/2007 | Varanasi et al. ............. 717/136 |
| 2007/0288885 A1 * | 12/2007 | Brunel et al. ................. 717/104 |
| 2011/0131398 A1 * | 6/2011 | Chaturvedi et al. ............... 713/1 |
| 2011/0131555 A1 * | 6/2011 | Varanasi et al. ............. 717/136 |

FOREIGN PATENT DOCUMENTS

WO   WO 2002044936 A2   6/2002

OTHER PUBLICATIONS

Sparx Systems, "Enterprise Architect 7.1, Reviewer's Guide", 22 pp., 2008.
Sparx Systems, "Enterprise Architect, Version 7.1", 2 pp. 2008.
U.S. Appl. No. 12/002,584, filed Dec. 18, 2007, Zarafyants, et al.

* cited by examiner

*Primary Examiner* — Li B Zhen
*Assistant Examiner* — Arshia S Kia
(74) *Attorney, Agent, or Firm* — Muirhead and Saturnelli, LLC

(57) ABSTRACT

Described are techniques for generating a parser. A graphical representation of a finite state machine is provided for determining whether an input is syntactically valid in accordance with a syntax represented by the graphical representation. A second representation is generated which corresponds to the graphical representation. Using the second representation, a parser is generated for parsing an input. The parser determines whether the input is syntactically valid in accordance with the syntax.

20 Claims, 17 Drawing Sheets

```
<UML:Transition xmi.id="EAID_4A3CAB2E_F771_4f8b_AFEB_C8A366BE0DDB" visibility="public"
    source="EAID_D6E9E6D7_1A82_45de_BA88_E0D14F122CDE"  →702a
    target="EAID_4EBD92B7_2B54_42c3_994C_634EE0D12D1E"/>  →704a
    <UML:Transition.guard>
        <UML:Guard>
            <UML:Guard.expression>
                <UML:BooleanExpression body="Error"/>
            /UML:Guard.expression>
        </UML:Guard>
    </UML:Transition.guard>
    <UML:ModelElement.taggedValue>
        <UML:TaggedValue tag="style" value="3"/>
        <UML:TaggedValue tag="ea_type" value="StateFlow"/>
        <UML:TaggedValue tag="direction" value="Source -> Destination"/>
        ..
702b→  <UML:TaggedValue tag="ea_sourceName" value="PS_Start"/>
704b→  <UML:TaggedValue tag="ea_targetName" value="Error: "Unsupported action name
                                            is specified""/>
        <UML:TaggedValue tag="ea_sourceType" value="State"/>
        <UML:TaggedValue tag="ea_targetType" value="StateNode"/>
702c→  <UML:TaggedValue tag="ea_sourceID" value="62"/>
704c→  <UML:TaggedValue tag="ea_targetID" value="49"/>
        ..
        <UML:TaggedValue tag="mt" value="[Error]"/>
    </UML:ModelElement.taggedValue>
</UML:Transition>
```

```xml
<UML:Transition name=" [LX_Options]" xmi:id="EAID_57E047CC_A52C_42c6_85D8_C6FEC1DF2264" visibility="public"
source="EAID_A2EC270E_8443_428f_B9E8_A2E69ED4A3C6"  →802a
target="EAID_6D513634_9AC7_4814_8CC6_CCBBF9AECFF7"/>  →804a
    <UML:Transition.guard>
        <UML:Guard>
            <UML:Guard.expression>
                <UML:BooleanExpression body="LX_String"/>
            </UML:Guard.expression>
        </UML:Guard>
    </UML:Transition.guard>
    <UML:Transition.effect>
        <UML:ActionSequence>
            <UML:ActionSequence.action>
                <UML:UninterpretedAction name="IR: diskId=<token value>"/>
            </UML:ActionSequence.action>
        </UML:ActionSequence>
    </UML:Transition.effect>
    <UML:ModelElement.taggedValue>
        <UML:TaggedValue tag="style" value="3"/>
        <UML:TaggedValue tag="ea_type" value="StateFlow"/>
        <UML:TaggedValue tag="direction" value="Source -> Destination"/>
        <UML:TaggedValue tag="privatedata2" value="LX_String"/>
        <UML:TaggedValue tag="privatedata3" value="IR: diskId=<token value>"/>  →810
        <UML:TaggedValue tag="ea_localid" value="67"/>
802b→   <UML:TaggedValue tag="ea_sourceName" value="PS_Disk"/>
804b→   <UML:TaggedValue tag="ea_targetName" value="PS_DiskId"/>
        <UML:TaggedValue tag="ea_sourceType" value="State"/>
        <UML:TaggedValue tag="ea_targetType" value="State"/>
802c→   <UML:TaggedValue tag="ea_sourceID" value="56"/>
804c→   <UML:TaggedValue tag="ea_targetID" value="52"/>
        ..
        <UML:TaggedValue tag="mt" value=" [LX_String]
 /IR: diskId=<token value>"/>
        ..
    </UML:ModelElement.taggedValue>
</UML:Transition>
```

FIGURE 10

```
<UML:PseudoState name="Error: "The syntax is type=<disk type>""
  xmi.id="EAID_63368FB9_DD83_4fca_A6EF_1F52452B901C" visibility="public"
  namespace="EAPK_DFB3415E_3FAA_4963_A04E_9A24FAEC4FB7" kind="final"/>
    <UML:ModelElement.taggedValue>
      ..
      <UML:TaggedValue tag="ea_localid" value="51"/>
      <UML:TaggedValue tag="ea_eleType" value="element"/>
      <UML:TaggedValue tag="style" value="BackColor=-1;BorderColor=-1;BorderWidth=-1;
        FontColor=-1;VSwimLanes=0;HSwimLanes=0;BorderStyle=0;"/>
    </UML:ModelElement.taggedValue>
    ..
</UML:PseudoState>

<UML:SimpleState name="PS_DiskId" xmi.id="EAID_6D513634_9AC7_4814_8CC6_CCBBF9AECFF7"
  visibility="public" namespace="EAPK_DFB3415E_3FAA_4963_A04E_9A24FAEC4FB7">
    <UML:ModelElement.taggedValue>
      ..
      <UML:TaggedValue tag="ea_localid" value="52"/>
      ..
    </UML:ModelElement.taggedValue>
</UML:SimpleState>
```

FIGURE 11

TECHNIQUES FOR AUTOMATIC GENERATION OF PARSING CODE

BACKGROUND

1. Technical Field

This application generally relates to syntax modeling, and more particularly to techniques used for generating code to perform parsing of an input in accordance with a syntax.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

A host system including a host processor may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with management of a data storage system, commands may be issued using client software. The client software may be installed and executed on a host system which communicates with one or more data storage systems to issue commands to the one or more data storage systems. The commands may be entered via the client software using a command line interface (CLI). The commands may be, for example, to perform data configuration operations, obtain information regarding the status or current configuration, and the like. The client software may be used in connection with issuing commands to different data storage systems each having a different command line syntax or a different version of a supported command line syntax.

In connection with the data storage system commands, as well as more generally in connection with other inputs besides commands, an input may be processed to determine whether the input is validly formed in accordance with a syntax. Parsing, as performed by a parser, is the process of analyzing the input to determine whether the input can be generated in accordance with the syntax and, therefore, recognized as valid. As a result of parsing, such as of parsing commands, values of command parameters may be extracted from the input. The parsing may be performed using parser code produced by manually coding the parser. Rather than manually having a programmer write the parser code, a tool may be used to generate parser code. For example, tools, such as YACC (yet another compiler compiler) developed for use with the Unix operating system, may be used in connection with generating parser code. In order to use tools such as YACC, the grammar of the syntax may be required to be represented in a complex and formal form such as a rules written in Backus-Naur form (BNF). The process of representing the grammar in such a formal form may require an unacceptable amount of time, effort and/or knowledge. Representing the grammar rules in such a formal and complex representation may have drawbacks in that additional knowledge and experience may be necessary in order to formally express the grammar in the required form. Such knowledge may also be required in order to modify the formal representation, for example, in the event of a syntax change.

SUMMARY OF THE INVENTION

In accordance with one aspect of the invention is a method of generating a parser comprising: providing a graphical representation of a finite state machine for determining whether an input is syntactically valid in accordance with a syntax represented by said graphical representation; generating, from said graphical representation, a second representation corresponding to said graphical representation; and generating, using said second representation, a parser for parsing an input to determine whether the input is syntactically valid in accordance with said syntax. The graphical representation may be a diagram formed from a unified modeling language including a set of graphical notation techniques specifying how to graphically represent elements of said finite state machine in said graphical representation. The second representation may be a textual representation formed using a markup language. The graphical representation may be drawn using a modeling tool. The modeling tool may automatically generate the second representation as a textual representation. The textual representation may be in XML and the graphical representation may be represented using a standardized unified modeling language. The graphical representation may include elements representing first states of said finite state machine, said first states corresponding to parsing states when parsing an input. The graphical representation may include elements corresponding to expected tokens causing state transitions. The finite state machine may have transition rules represented in said graphical representation that correspond to production rules of a grammar for said syntax, and the finite state machine may have states represented in said graphical representation that correspond to non terminals of the grammar. The finite state machine may be a deterministic finite state machine representing a regular grammar for syntax of a command line, and the parser may parse a command line obtained using a command line interface. The textual representation may include a transition table. The textual representation may include one or more syntax rules.

In accordance with another aspect of the invention is a method of generating a parser comprising: modeling a command line interface syntax as a finite state machine diagram; generating, from said finite state machine diagram, a textual representation of the command line interface syntax corresponding to said finite state machine diagram; generating, using said textual representation, code for parsing an input command to determine whether the input command is syntactically valid in accordance with said command line interface syntax; parsing the input command using the code for parsing and generating an intermediate representation of the input command if the input command is syntactically correct; and providing the intermediate representation to another code portion that performs processing to implement the input command. The command line interface syntax may represent command syntax for data storage system commands. The textual representation may be provided to a data storage system and the data storage system may generate the code for parsing. A host connected to the data storage system may request from said data storage system an update to the command line interface syntax. The data storage system may send a response including the textual representation. A grammar version identifier may be associated with said textual representation of the command line interface syntax.

In accordance with another aspect of the invention is a computer readable medium comprising executable code stored thereon for generating a parser, the computer readable medium comprising executable code stored thereon for: providing a graphical representation of a finite state machine for determining whether an input is syntactically valid in accordance with a syntax represented by said graphical representation; generating, from said graphical representation, a second representation corresponding to said graphical representation; and generating, using said second representation, a parser for parsing an input to determine whether the input is syntactically valid in accordance with said syntax. The second representation may be a textual representation including content written in accordance with a markup language. A modeling tool may be used to draw the graphical representation. The modeling tool may automatically generate the second representation. A portion of the graphical representation may be automatically generated using a template based on one or more text inputs where elements in the graphical representation corresponding to the one or more text inputs are generated in accordance with the template. The template may indicate that one or more corresponding states and associated transitions are automatically included in the graphical representation for the one or more text inputs.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9, 10 and 11 are examples illustrating in more detail portions that may be included in the XML file representing the FSM diagram in an embodiment performing the techniques herein;

DETAILED DESCRIPTION OF EMBODIMENT(S)

Figure 1:
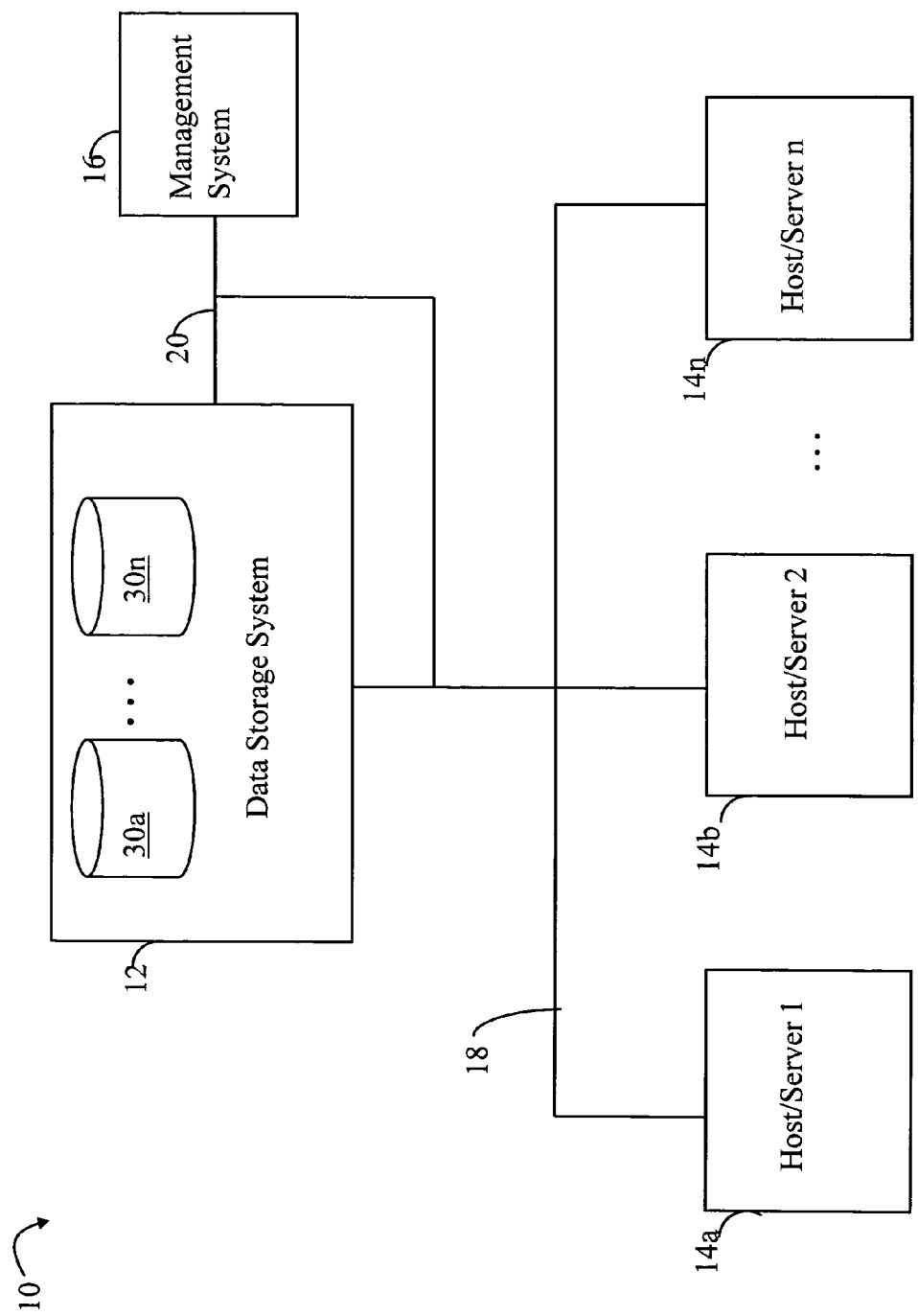
FIG. 1 is an example of an embodiment of a system that may utilize the techniques described herein.

Referring to FIG. 1, shown is an example of an embodiment of a that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or Fibre Channel connection. Each of the data storage systems 12 may include one or more physical storage devices or drives 30a-30n, such as disks, upon which data is stored.

It should be noted that as illustrated in the example 10, the management system 16 and host 14 may communicate directly in accordance with the techniques herein.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment. As noted above, a host may directly communicate with the management system.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices 30a-30n upon which data is stored. The appliance may include software used in connection with storing the data of the hosts on the appliance and also software used in connection with configuring the data storage for use by the hosts in connection with techniques described herein.

In another embodiment, the data storage systems 12 may include one or more data storage systems such as one or more of the data storage systems or data storage arrays offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein in following paragraphs.

Servers or host systems, such as 14a-14n, provide data and access control information through channels to the storage systems, and the storage systems may also provide data to the host systems also through the channels. The host systems may not address the disk drives 30a-30n of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In connection with management of a data storage system, commands may be issued using client software. The client software may be installed and executed on a host system, such as each of hosts 14a-14n, which communicates with one or more data storage systems to issue commands to the one or more data storage system. The commands may be entered via the client software using a command line interface (CLI). The client software may be used in connection with issuing commands to different data storage systems. Each of the data storage systems may have a different command line syntax or a different version of a supported command line syntax. For example, a first data storage system may be EMC Corporation's CLARiiON® data storage system. A second data storage system may be EMC Corporation's Symmetrix® data storage system. Each of the foregoing first and second data storage systems may have different command sets and associated syntaxes. As a further variation, a third data storage system may also be a CLARiiON® data storage system or a Celerra® data storage system (also by EMC Corporation) but support a command line syntax which is a different version than that of the first data storage system. Client software on the host may be used to communicate with all three of the foregoing data storage systems and issue commands via a CLI.

It should be noted that the different command sets or multiple syntaxes supported may vary with different data storage system vendors as well as type of data storage system for a single vendor. The command sets may vary, for example, if a first data storage system receives block-based commands and a second data storage system receives file-based commands. The foregoing are just some examples of when different command line syntaxes may be used on data storage systems. Client software, such as on a host, may be used to communicate with data storage systems having multiple command line syntaxes for any one of a variety of different reasons.

The syntax for a command line or other input may be characterized as an expression of the grammar governing the construction or formation of valid inputs. The syntax may be used in making a determination or recognition of valid inputs where a valid input can be generated using the defined syntax of the grammar. The set of valid inputs that can be produced from the grammar may also be referred to as the language for the grammar.

As known in the art, a CLI may be used, for example, in processing commands of a script or issuing single commands interactively via a command line. In connection with one embodiment described herein, the commands may be used to perform any one of a variety of different tasks in connection with data storage system management, monitoring and configuration such as, for example, provisioning storage, returning status and configuration information about the data storage system and devices, and the like. It should be noted that although the techniques herein are described with respect to a CLI used for issuing commands between a host having client software thereon and a target which is a data storage system, it will be appreciated by those skilled in the art that the techniques herein have broader applicability. For example, the client software may execute on a different system than a host as described herein and the target may be a system other than a data storage system. Although different advantages may be achieved for use with a particular type of interface, the techniques herein are also not limited for use with a particular type of interface, such as a CLI, and may be used in connection with other types of user interfaces, such as a graphical user interface.

In accordance with techniques herein, command line parsing for multiple, different, command line syntaxes may be performed by client software such as included on the host. Command line parsing may also be performed by a parser on the data storage system. Techniques are described in following paragraphs for automatically generating code for a parser which parses the command line for one or more different syntaxes as may be supported in an embodiment. The parser code may be automatically generated from one or more inputs expressing information regarding the different supported syntaxes and associated parsing grammars. The information regarding the syntaxes may be represented in a form which can be processed by a code module that generates the parser code. The one or more inputs may represent a different grammar for each supported syntax. In one embodiment, a grammar expressing a valid command line syntax may be represented in the form of one or more XML (extended markup language) files which are inputs to the module generating the parser code. Each grammar may set forth different grammar rules used to describe a valid command syntax, such as a set of commands, for use on one type of the data storage system. Each different command set associated with a different type of data storage system may have a different grammar and syntax. Also, each time there is a modification to a command set requiring a change to the grammar for the command set, a new version of a grammar representing the syntax may exist. In an embodiment using the techniques herein, the XML file (which represents a command syntax and which is an input to the module generating the parser code) may be automatically generating using a modeling tool from a graphical representation of the syntax such as a finite state machine (FSM) diagram.

The foregoing and other features and advantages of the techniques herein are described in more detail in following paragraphs.

As described above in connection with one embodiment, the techniques herein may be used in connection with generating parser code for parsing a command issued from the host to the data storage system via CLI client software executing on the host. Additional details in connection with command line syntaxes in an embodiment with a data storage system and host are described, for example, in U.S. patent application Ser. No. 12/002,584, (the '584 application) filed Dec. 18, 2007, ZARAFYANTS, et al., CLIENT WITH FLEXIBLE GRAMMAR-BASE SYNTAX, which is incorporated by reference herein. Thus, one use of the techniques herein is in connection with generating parser code for parsing a command line obtained using a CLI for data storage system commands. Examples presented herein for purposes of illustration make reference to a CLI and data storage system commands. However, as will be appreciated by those skilled in the art and also described herein, the techniques for parser code generation have much broader applicability and usage.

In one embodiment using a CLI, each command line may be described as a single line of text that contains all necessary parameters for execution of a single operation on a target data storage system. The command line may be parsed in accordance with a syntax describing the command line format. In other terms, the grammar for the syntax describing validly formed commands may define, for example, how keywords, parameters (e.g., commands, options, switches) and the like) comprise a command line. If the command line is recognized as valid by the parser in accordance with the syntax, no syntax error in parsing occurs and further processing may be performed to implement the valid command.

As described in more detail in the '584 application, a particular syntax or grammar may be denoted by a grammar identifier and a version number. The grammar identifier may indicate the particular command line syntax or command set as used on a data storage system. For each grammar identifier, one or more versions of the command line syntax may be supported. For example, a grammar identifier may be used to identify one command line syntax for a particular vendor's data storage system. There may be multiple versions of the command line syntax supported in accordance with different switches, parameters, and the like, supported at various points in time as the command line syntax evolves with newly added features, changes to existing features, and the like. Each time there is a change to the command line syntax of a grammar, a new version of the grammar may be generated. In one embodiment in which each grammar is represented as an XML file, a new XML file may be used for each version of the grammar.

What will be described in following paragraphs are techniques that may be used in connection with syntax modeling and automatically generating parsing code used to parse a command line.

Figure 2:
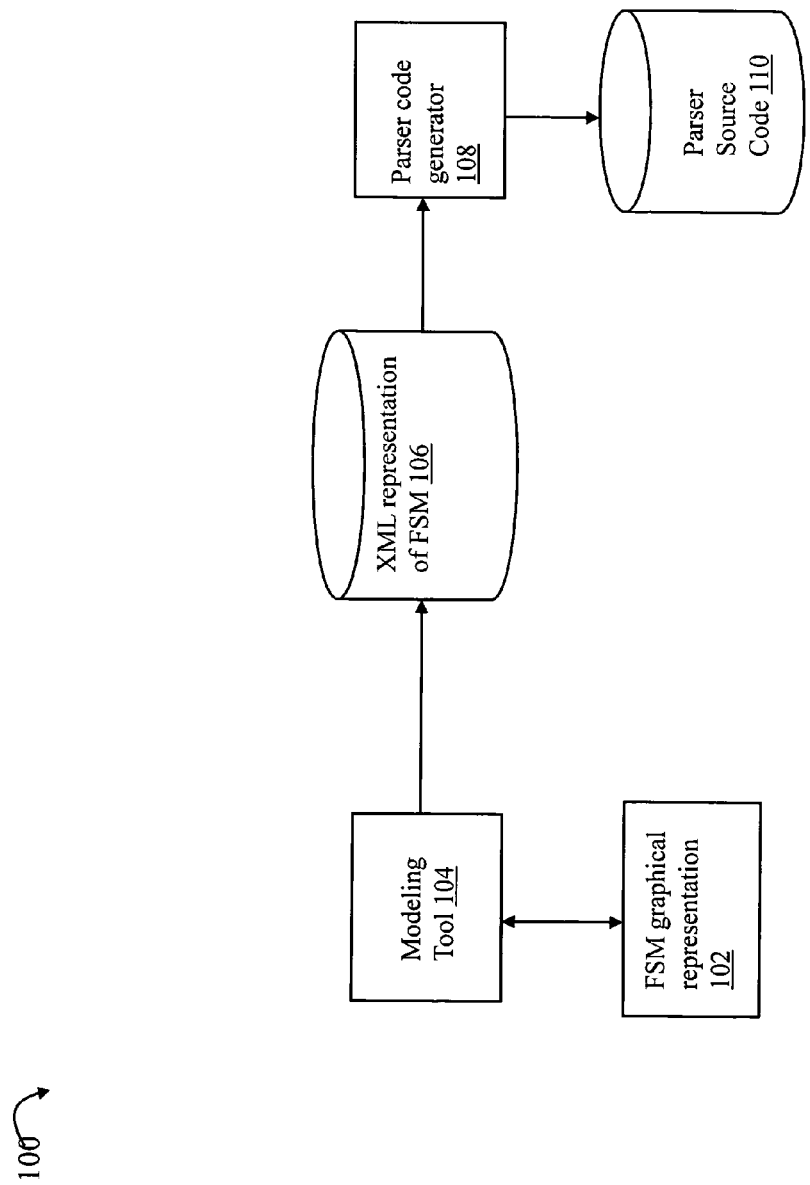
FIGS. 2 and 3 are examples of components that may be included in an embodiment performing the techniques herein.

Referring to FIG. 2, shown is an example of components that may be used in an embodiment in connection with techniques herein for automated parser code generation. The example 100 includes an finite state machine (FSM) graphical representation 102, a modeling tool 104, an XML representation 106 of the FSM, a parser code generator 108 and parser source code 110. The components of 100 may be located on one or more of the host, data storage system, and/or other components for use with the techniques herein.

A grammar or syntax for the command line may be graphically represented as a diagram. In one embodiment, the syntax may be represented as an FSM graphical representation 102 using a syntax modeling tool 104 such as Enterprise Architect from Sparx Systems Pty Ltd. The FSM may be graphically represented by the tool using a modeling language, such as the Unified Modeling Language (UML). UML may be characterized as a standardized modeling language which includes a set of graphical notations to create abstract models and represent the different elements of the FSM graphically in accordance with notation of UML. UML is an international standard, ISO/IEC 19501:2005 Information technology-Open Distributed Processing-Unified Modeling Language. UML models may be automatically transformed into other representations. Tools, such as the Enterprise Architect, may provide for automatically generating one or more other representations from the graphical representation, such as from the UML graphical representation. The Enterprise Architect provides for automatically generating an XML representation 106 from the FSM graphical representation 102 representing as a UML model. The XML representation 106 may be an input to the parser code generator 108 which automatically generates parser source code 110. The XML representation 106 may be one form of the graphical representation 102 which can be processed as an input by the parser code generator 108. The modeling tool 104 or other tool may be used to generate an XML or other representation usable as an input for processing by the parser code generator 108. For example, in one aspect, XML may be characterized as a textual representation of the FSM diagram or graphical representation 102. Besides an XML representation, the FSM diagram may be represented, for example, as a set of syntax rules, state transition table, and the like. The rules may be in a form, such as BNF, which is known to the generator 108. The form of the input 106 may be, for example, in a human readable form, binary form, or other form which can be processed by the generator 108. An embodiment of the parser generator 108 may, more generally, produce parser code having a form other than source code. The generator 108, for example, may produce a binary form of the parser, another intermediate representation of the parser to be further processed, and the like.

An FSM may be represented using a state diagram or state transition diagram expressed in accordance with the modeling language. An FSM may be defined using a set of transitions and states (including one or more start states and one or more final accepting states). A transition from one state to a next state may be based on the next token in the input stream. Each of the elements of the FSM may be graphically represented, such as using a directed graph (or digraph), using elements of the UML or other modeling language. Edges of the graph may correspond to transitions, and nodes of the graph may correspond to states. UML has a variety of different types of diagrams including a state machine diagram that may be used to graphically represent the FSM (as indicated by element 102) for the CLI syntax. A UML model may represent the states, transitions, inputs causing the transitions, and the like, using standard notation and graphical elements. The foregoing is described in more detail in following paragraphs.

The command line syntax may be represented using a regular grammar. As known in the art, regular grammars are a subset of context free grammars (CFGs). A regular grammar may be characterized as a grammar having rules in one of the following forms:
1. A→a
2. A→aB
3. A→e where the uppercase letters correspond to nonterminals, lower case letter "a" corresponds to a terminal and "e" represents the empty or null string. An FSM can be deterministic or non-deterministic. Any regular grammar can be represented as a deterministic FSM or deterministic finite automata (DFA), and any CFG can be represented using BNF rules. A DFA is an FSM where, for each pair of a state and an input symbol, there is one and only one transition to a next state. Generally, a DFA takes as an input a string of input symbols. For each input symbol it will then transition to a state given by following a transition function. When the last input symbol has been received, the DFA either accepts or rejects the input depending on whether the DFA is in an accepting final state or a non-accepting final state. In an embodiment, the CLI may be represented using a DFA and using a regular grammar.

It should be noted that existing tools, such as YACC, used for parser code generation may take as an input a file expressing the grammar as a set of BNF rules. In such a case, the existing tools may use a form of the grammar which may be characterized as more complex than as described herein since existing tools such as YACC may be capable of generating parser code for any CFG rather than for regular grammars which are a subset of CFGs. Thus, in instances where the grammar is a regular grammar, different techniques may be used to express the regular grammar where such techniques may not generally be used with any and all CFGs.

In accordance with techniques herein in one embodiment, the grammar may be expressed in a graphical form 102 by drawing a diagram of the FSM using the modeling tool 104. If there is a change to the grammar syntax, a user can accordingly modify the graphical representation of the FSM diagram 102, automatically generate the XML file 106 representing the FSM with the tool, and then, using the XML file 106 with the parser code generator 108, automatically generate updated parser code 110 for the new syntax. The updated XML file 106 can be transmitted, such as to the data storage system, where the parser code can be generated. Thus, the grammar or syntax updates for the CLI may be communicated by transmitting the updated XML file, as may be produced on one system or component, to another second system or component. At the second system or component, the parser code generator may be utilized to generate the parser code 110 from the transmitted XML file 106 representing the regular grammar for the CLI.

What will now be described is an example in which an embodiment may have 3 different syntaxes for a same command. In connection with the state transition diagrams shown herein for illustration, it should be noted that the diagrams do not include elements which are all in accordance with the UML or other particular modeling language.

A first syntax of a create command may be:
create disk <disk id>[settings <settings list>]
where
   optional elements are enclosed within brackets "[" "]";
   <disk id> is numeric value between 0 and 255;
   <settings list> is space separated list of pairs, each pair being of the form <setting name>=<setting value>, where "setting name" may be "name", "type" or "size". When "name" is specified, name indicates a text name to be associated with the disk, "size" indicates the size of the disk in MB, and "type" indicates the type of the disk.

A second syntax of the create command may be similar to the first syntax above but with all settings being required, having a definitive order, and where settings are separated by commas. The second syntax may be represented as:
   create disk <disk id> settings name=<disk name>, type=<disk type>, size=<disk size>

A third syntax of the create command may be:
newdisk <disk id>[-name <disk name>] [-type <disk type>] [-size <disk size>]
where
   <disk id> is a required parameter and always the first parameter; and
   <disk name>, <disk type>, <disk size> are optional and have an undefined order.

Each of the foregoing three syntaxes may represent the same logical command. A different parser may be used to parse a command line written in accordance with each of the three different syntaxes.

In an embodiment, the generated parser code may be used to produce as an output an intermediate representation (IR) if the command is syntactically correct. For a command having a semantic meaning which is correctly expressed using any one of the foregoing 3 syntaxes, the same IR may be generated by the parser code. Thus a valid command instance which is expressed using one of the supported syntaxes may be result in the parser code producing the same IR. For example, suppose a user expresses a same command in three ways using the three different syntaxes just described:
(Syntax 1) create disk 123 settings size=100 type=SATA name="My Disk"
(Syntax 2) create disk 123 settings name="My Disk", type=SATA, size=100
(Syntax 3) newdisk 123-name "My Disk"-type SATA-size 100

First parser code may be generated using the techniques herein for syntax 1. Second parser code different from the first may be generated using the techniques herein for syntax 2. Third parser code different from the foregoing first and second parser code may be generated using the techniques herein for syntax 3. The IR generated using any of the foregoing first, second and third parser codes is the same and may be represented as:
    entity=disk
    action=create
    diskId=123
    diskSize=100
    diskType=SATA
    diskName="My Disk"
In one embodiment, the IR may represent command line parameters in the form of (key=value) pairs. In one embodiment in which parser source code 110 is generated, the source code 110 may be compiled and linked to produce a machine executable or binary which is then loaded and executed using a processing unit. When the foregoing binary or machine executable is executed, a syntactically valid input command line is parsed and represented as an IR. In an embodiment using an IR, the same IR may be used and understood by the different data storage systems which may each use a different grammar. The IR may be further processed by other software in order to perform processing to implement a requested command on the data storage system.

Figure 3:
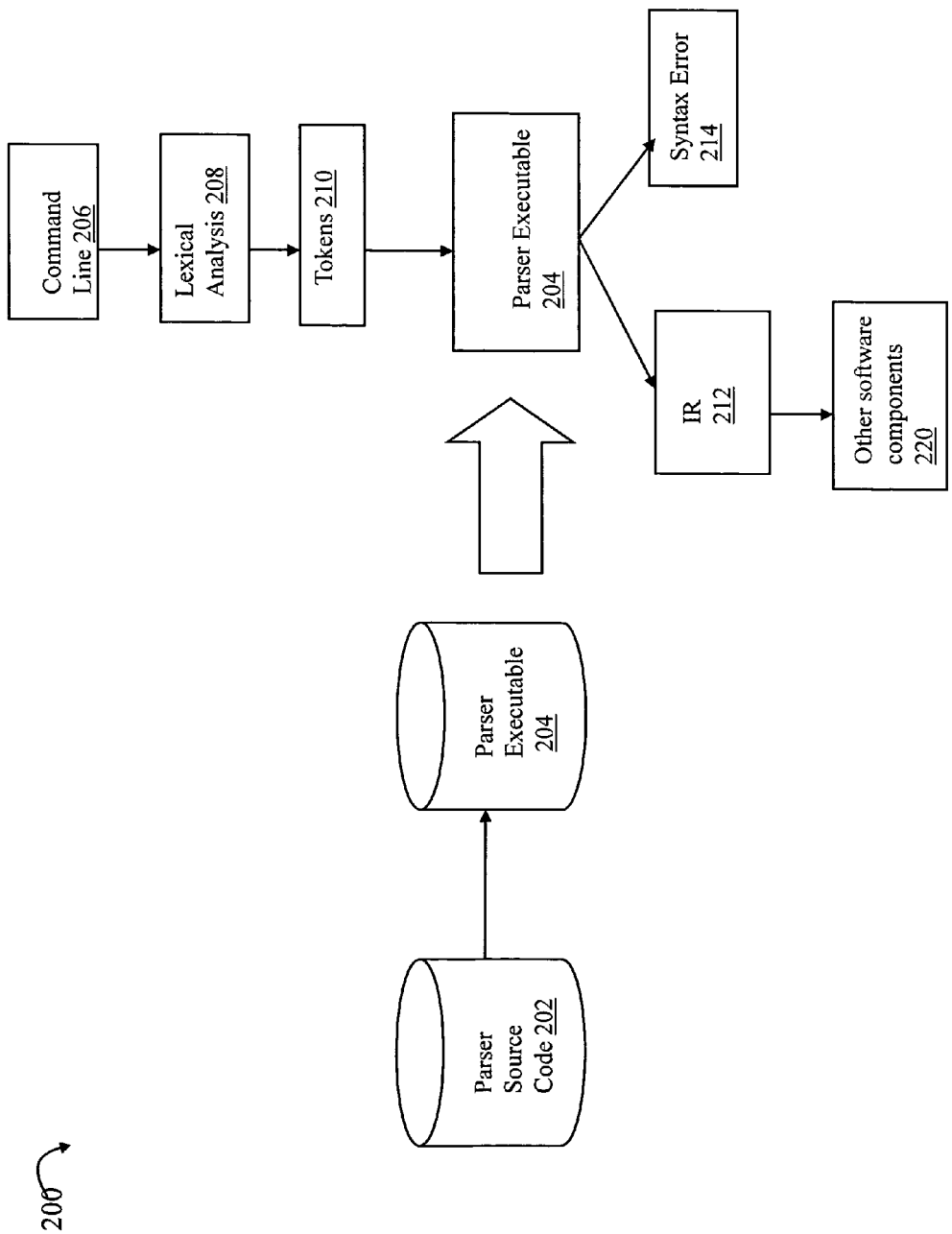

Referring to FIG. 3, shown is an example of a block diagram illustrating in more detail processing as may be performed by the parser using code generated using the techniques herein as just described. The example 200 includes parser source code 202, parser executable 204, command line 206, lexical analysis 208, tokens 210, IR 212, syntax error 214 and other software components 220. The parser source code 202 may be generated using the techniques herein and may be used to produce, such as by compiling, linking and loading, parser executable 204 representing a binary or machine executable of the command line parser for a particular syntax. The parser executable 204 may be used in combination with other code which is executed to process a command line 206. The command line 206 may be lexically analyzed by performing lexical analysis 208 to generate one or more corresponding tokens. In connection with lexical analysis, the input stream, which is the command line 206, is analyzed to form meaningful symbols or elements represented as tokens. The tokens 210 are then input to the parser executable 204 which performs syntactic analysis based on the syntax expressed previously using the FSM graphical representation and XML representation as described in connection with FIG. 2. If the command line 206 is syntactically correct, an IR 212 of the command line may be produced and used as an input to other software components 220 which perform further processing to implement the requested command line 206. If the command line 206 is not syntactically correct, a syntax error 214 may be generated.

A parser used for parsing inputs of a regular language may be represented by a state transition diagram indicating the possible valid states and transitions therebetween. The grammar representing the syntax for the regular language may be in any one a variety of different forms expressing the parser states and valid state transitions associated therewith.

Figure 4:
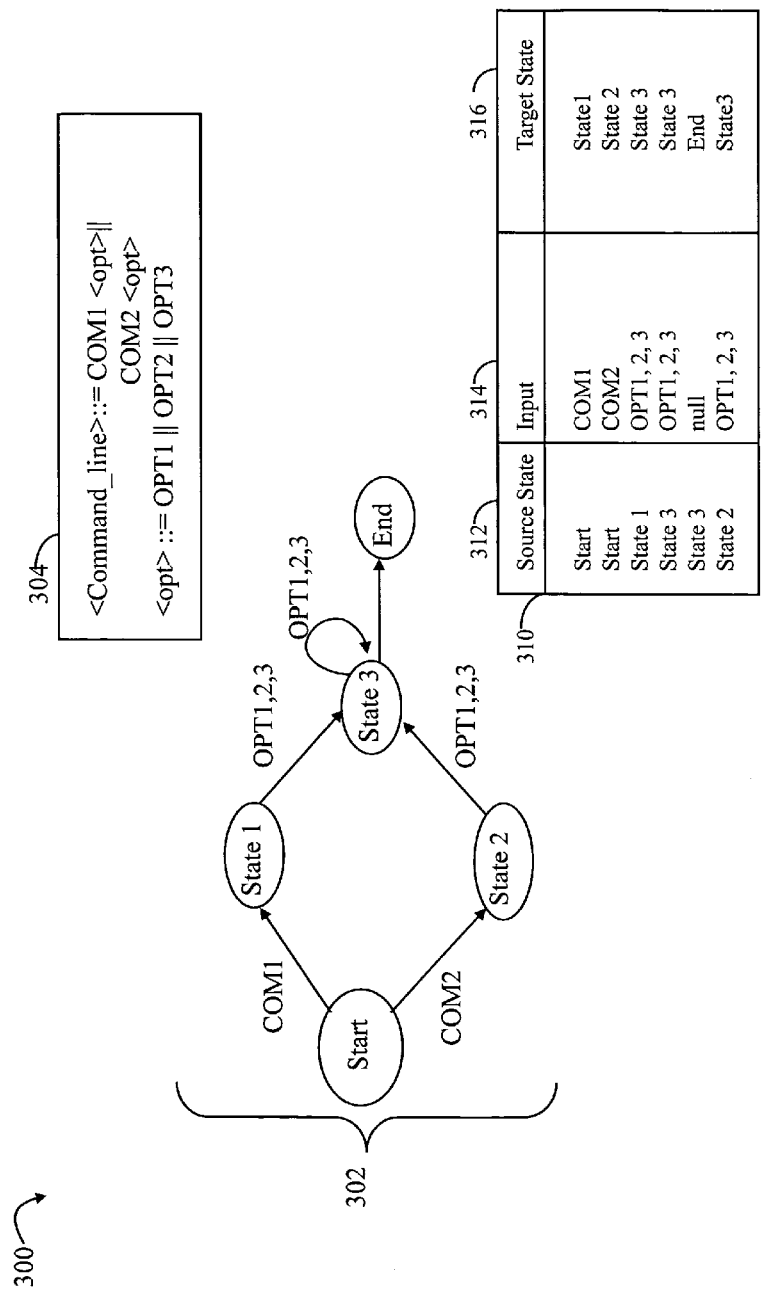
FIG. 4 is an example representation of a finite state machine (FSM) diagram and corresponding rules and state transition table as may be used in connection with an embodiment using the techniques herein.

Referring to FIG. 4, shown is an example illustrating a state transition diagram 302 and corresponding grammar rules 304 and state transition table 310. As will be appreciated by those skilled in the art, the example 300 is a simple example generally illustrating a command line syntax which includes 2 commands each having a same set of options. Elements 302, 304 and 310 represent different forms in which the grammar for the command syntax may be represented. Elements 302, 304 and 310 indicate that at least one command option must be specified. For notation purposes, the first command is "COM1" and the second command is "COM2". With reference back to FIG. 2, the FSM graphical representation 102 may be expressed in a form as illustrated by 302 from which the XML file 106 may be automatically generated by the modeling tool 104. The rules 304 are another way of expressing or representing the diagram of 302. In one embodiment using the techniques herein using the modeling tool, a user may manually draw the diagram 302 rather than expressing the syntax using rules as illustrated in 304.

It should be noted that the rule set 304 may be represented using BNF (Bachus Naur Form). In 304, grammar rules include grammar nonterminals enclosed in "< >" and other symbols may represent terminals. The "|" separates different alternative definitions or expansions of the left-hand side rule nonterminal that may be used in defining validly formed command lines. A command line is valid if it can be derived from, or produced using, the syntax rules of the rule set.

As described herein, the FSM diagram or graphical representation 302 may be used to automatically generate one or more other forms representing the syntax modeled by 302. The one or more other forms may be processed by a parser code generator. In one embodiment as illustrated in FIG. 2, an XML representation of the CLI syntax may be generated. Rather than, or in addition to, the foregoing XML representation, an embodiment may generate other syntax representations such as, for example, a rule set illustrated by 304 and/or a state transition table 310. In one embodiment as described herein, such other representations may be automatically generated by the modeling tool or other software from the FSM graphical representation. The one or more forms may vary with the ability of the modeling tool or other software to generate the forms as well as the particular forms which are able to be processed and understood by the parser code generator.

State transition table 310 is another way that the FSM diagram 302 may be represented in a textual or other form that may be processed by the parser code generator. The table 310 includes a source state 312, input 314, and target state 316. A row of the table 310 includes a source state 312 which transitions to the target state in the same row when the input in the row is the next token in the token stream. One or more of the source states in 312 may be indicated as a start or initial state and one or more target states in 316 may be indicated as a final or ending state (when a valid input has been parsed). If the table 310 does not include a row defining a particular target state for a source state and input, the source state implicitly transitions to the error state in the transition table representation illustrated.

Figure 5:
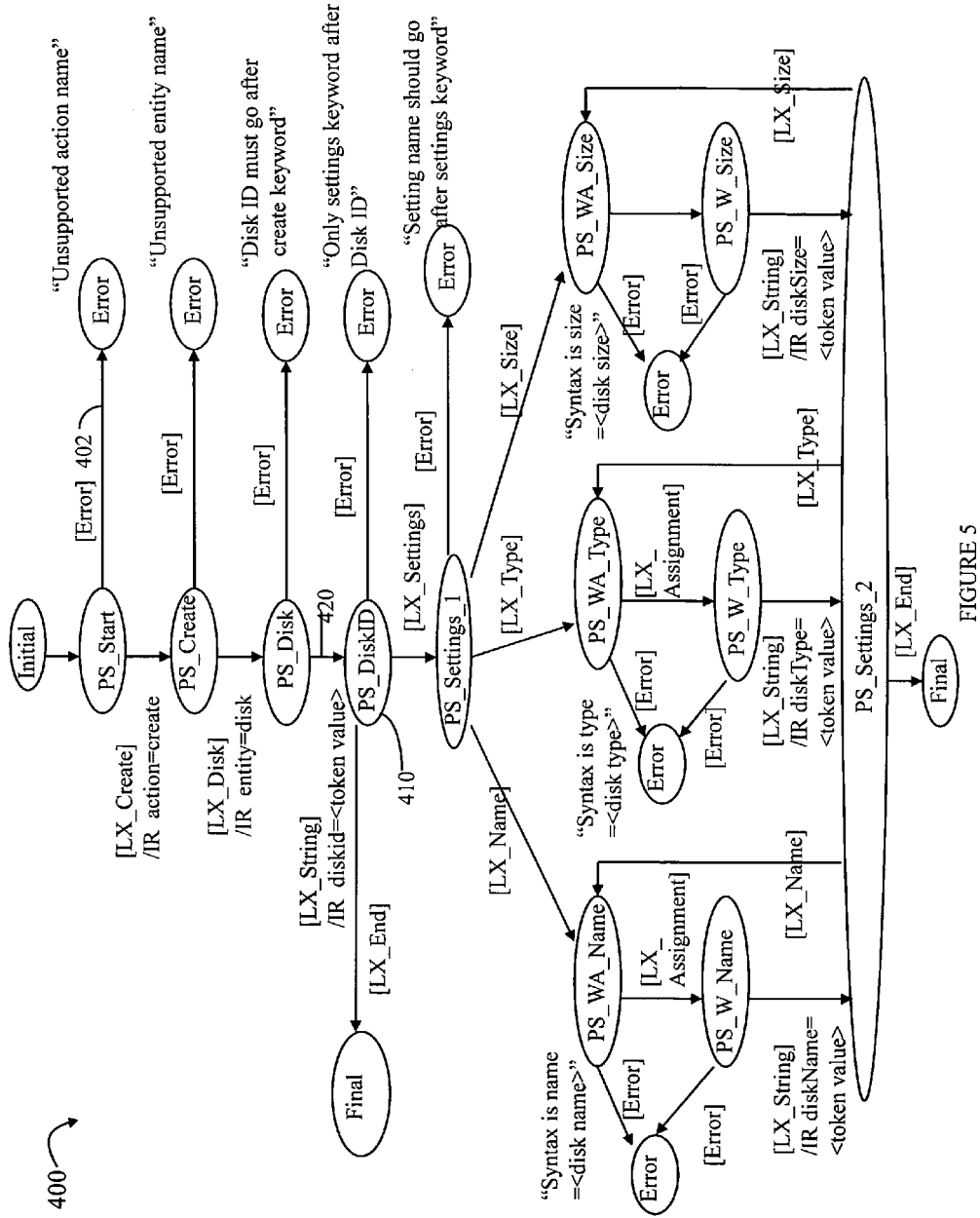
FIGS. 5, 6A, 6B and 7 are example representations of finite state machine diagrams for command line syntaxes that may be included in an embodiment performing the techniques herein.
Figure 6A:
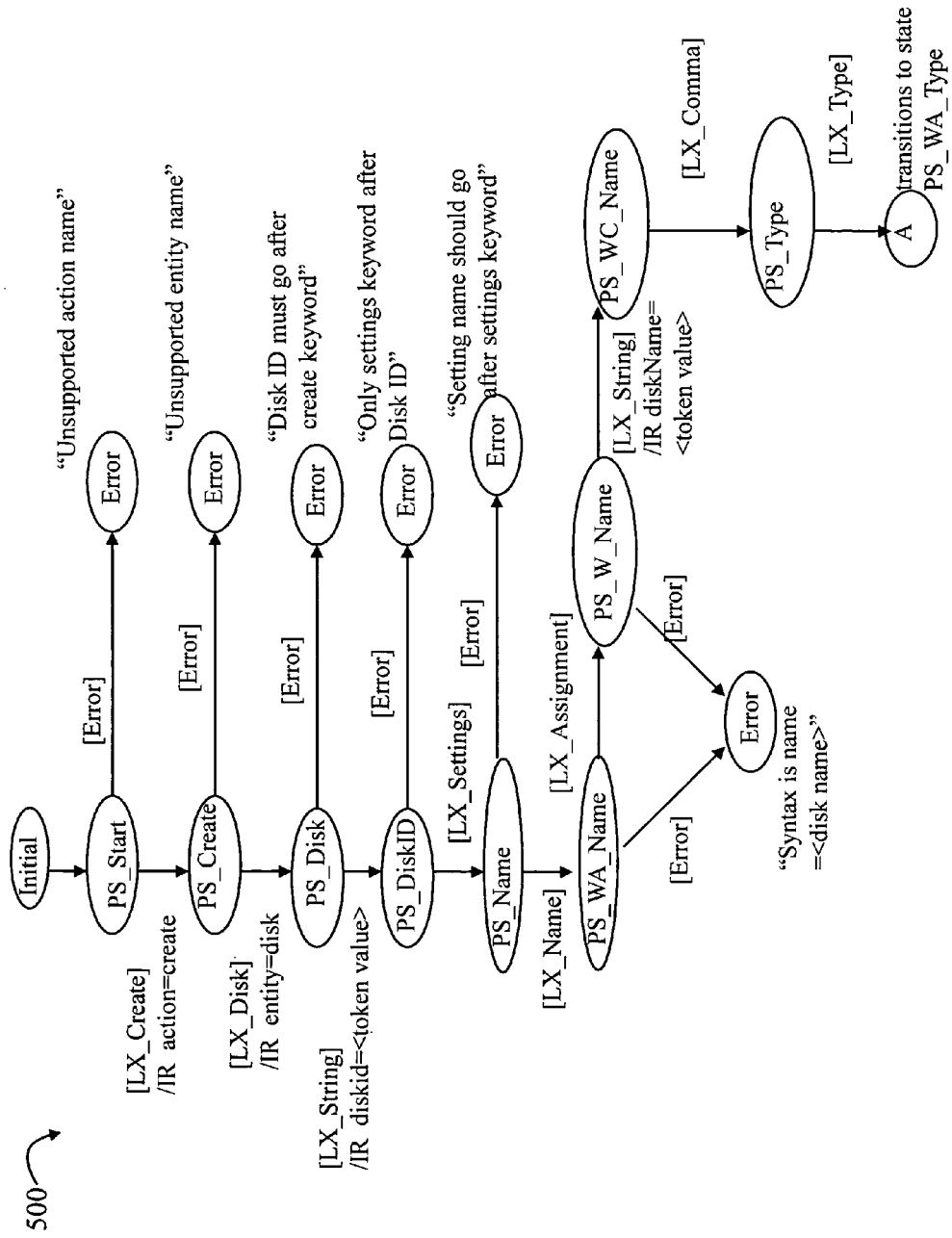
Figure 6B:
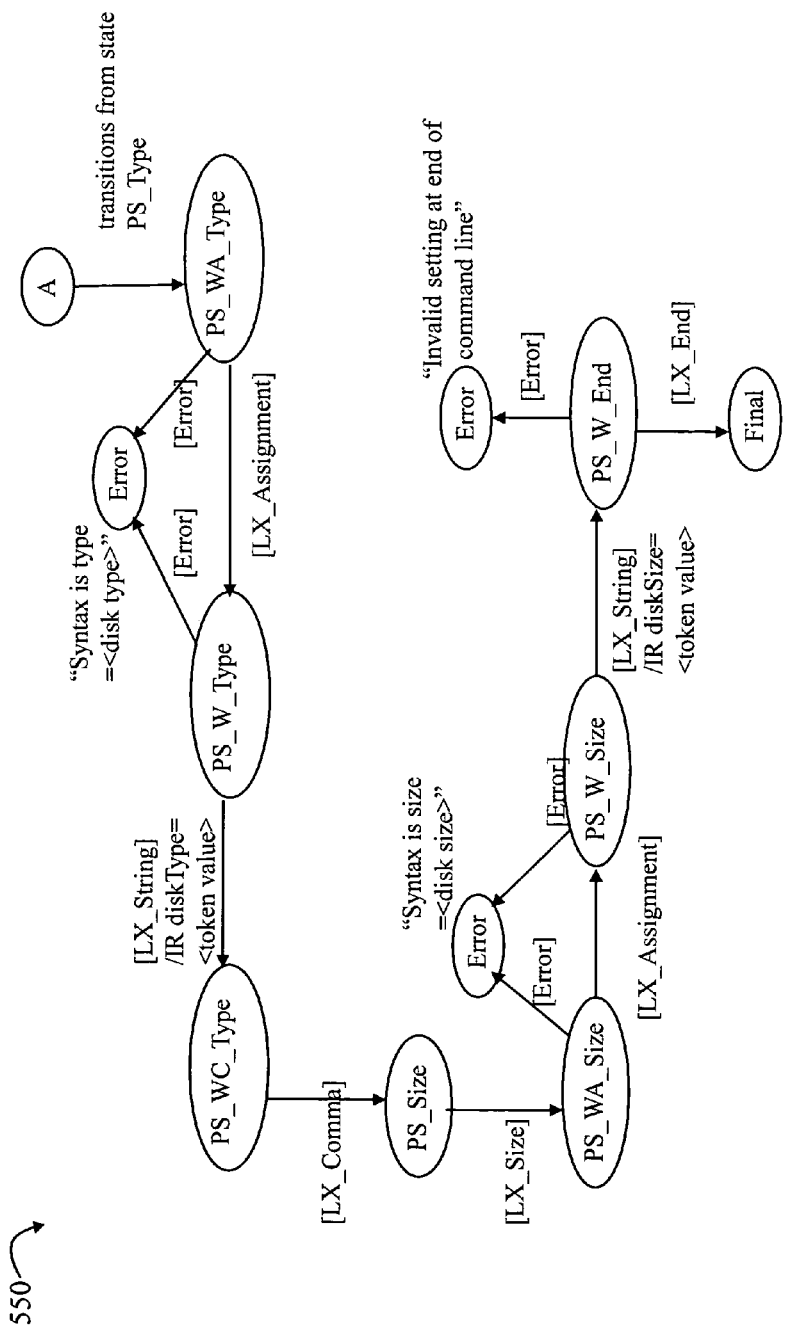
Figure 7:
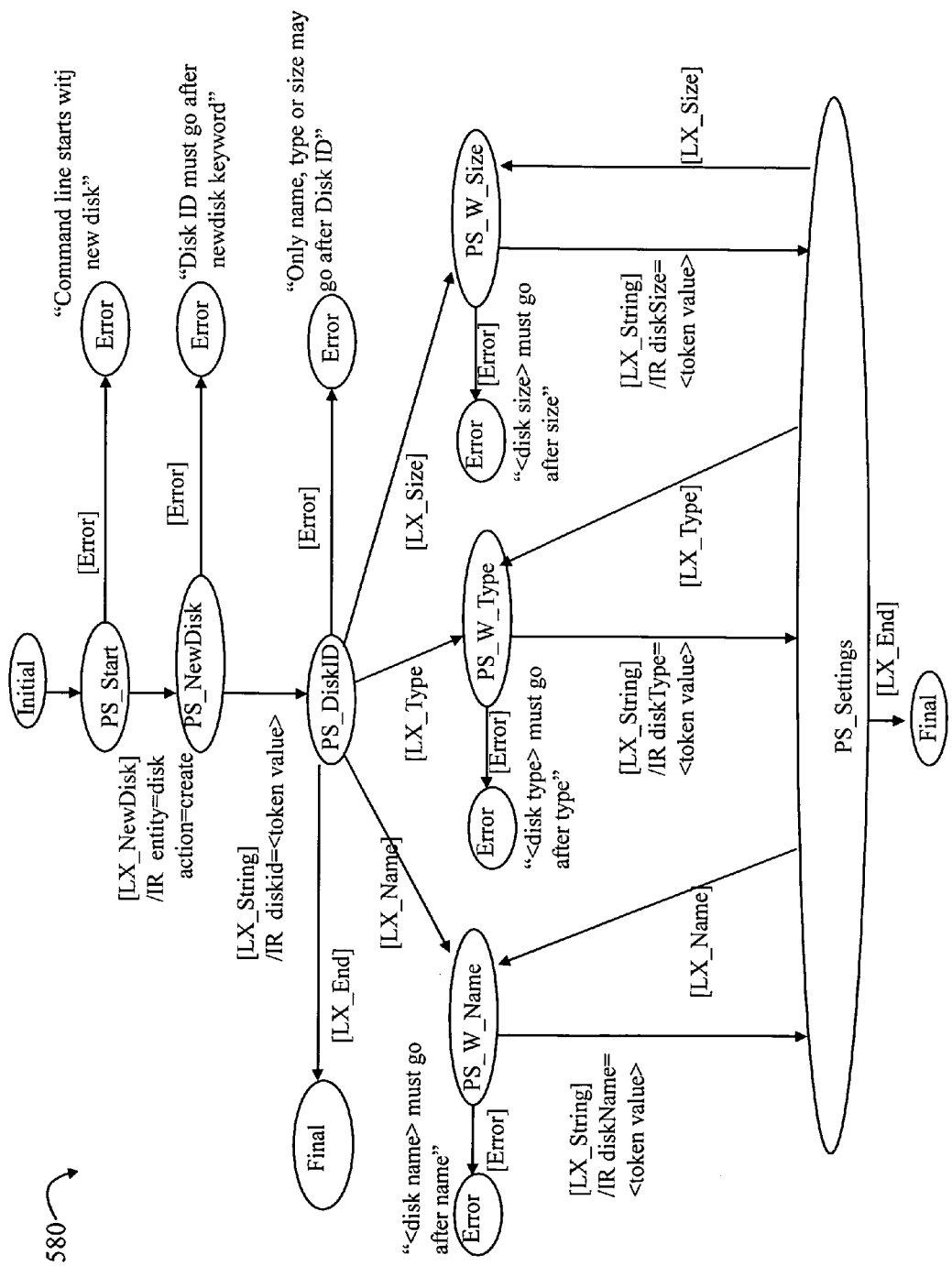

For purposes of illustrations, reference will be made in following paragraphs to the three (3) different command line syntaxes for the Create command described above. FIG. 5 is an example illustrating an FSM diagram for the first syntax. FIGS. 6A and 6B present an example illustrating an FSM diagram for the second syntax. FIG. 7 is an example illustrating an FSM diagram for the third syntax. The foregoing FSM diagrams may be produced using a modeling tool. An embodiment may use a modeling tool such as Enterprise Architect to draw a graphical representation of the FSMs presented in FIGS. 5, 6A, 6B and 7 in accordance with the UML model. The representation of the foregoing FSMs in accordance with UML may vary from the representation presented herein for purposes of illustration. In the FSM diagrams of FIGS. 5, 6A, 6B and 7, each state is represented using an oval shaped element. States which are start states are labeled Initial, and states which are final states are labeled Final indicating accepting states. States which are final states indicating error states are labeled Error. A transition from a first state (source state) to a next second state (target state) is indicated by an arrow from the first to the second state. A guard condition that must be true in order for a transition to occur from a source state to a target state appears next to the transition arrow and is enclosed between the symbols "[" and "]". For transitions to a target state which is not an error state, the guard condition corresponds to the expected token in the input stream causing the transition. If the target transition is an error state, the guard condition represents that an error condition occurs such as when an unexpected token appears in the input stream. If an action is performed during a transition, the action is added following a "I" after the guard denoted as causing the transition. In connection with the embodiment described herein, actions may be performed to store information in the IR for the command line input being parsed. Syntax error messages which describe particular error states are enclosed within double quotation marks near the corresponding error states. In the FSM diagrams, it should be noted that LX_String represents a condition where a next token is any string of characters.

In connection with the representation for the FSM diagrams of FIGS. 5, 6A, 6B and 7, the Error states may be characterized as pseudo states introduced for the purposes of representing the grammar. The Error state is used for explicitly illustrating such states in the representations. An embodiment may also represent the FSM diagram without the Error pseudo state such that tokens appearing at a point during input stream parsing which are unexpected implicitly cause a transition to an error state that may be not included in the FSM diagram.

Referring to FIG. 5, shown is an example 400 of an FSM diagram representing the first syntax for a create command. The following represents the mapping between command line tokens and transition guard states:

| Transition Guard | Command line token |
|---|---|
| LX_Create | create |
| LX_Disk | disk |
| LX_Settings | settings |
| LX_Name | name |
| LX_Type | type |
| LX_Size | size |
| LX_Assignment | = |
| LX_End | signals end of input |

If the command line token is the next in the input stream, then the corresponding transition guard is true.

A tokenizer may perform lexical analysis of a command line which produces a stream of tokens corresponding to the command line elements of the command line. For example, suppose there is a command line input of:

create disk 123 settings size=100 type=SATA name="My Disk"

To illustrate traversal of the FSM diagram of FIG. 5 representing the parsing steps for parsing the foregoing token stream, processing starts with the initial state. The initial state has only one unconditional transition, so control proceeds to state PS_Start. The tokenizer outputs the next token, create, which corresponds to LX_Create. PS_Start state has a transition with LX_Create as a transition guard condition which, when true, causes transition to the state PS_Create. The transition from PS_Start to PS_Create also contains an associated action denoted as IR action=create which means that the corresponding key=value pair is added to the IR. The next token is disk corresponding to LX_Disk causing a transition to state PS_Disk with an action to set entity=disk in the IR. The next token is "123". The current state PS_Disk state has a transition with the LX_String condition which means that "any character string" causes a transition to PS_Disk_Id. In accordance with the next token of "123", the current parsing state is advanced to PS_DiskId state and an action is performed to set diskId=123 in IR. The next token is settings which corresponds to LX_Settings causing a transition to state PS_Settings_1. The next token is size corresponding to LX_Size causing a transition to state PS_WA_Size. The next token is =causing a transition to state PS_W_Size. The next token is 100 causing a transition to state PS_Settings_2 and an action which sets diskSize=100 in the IR. The next token is type corresponding to LX_Type causing a transition to state PS_WA_Type. The next token is =causing a transition to state PS_W_Type. The next token is SATA causing a transition to state PS_Settings_2 and an action to set diskType=SATA in the IR. The next token is name corresponding to LX_Name causing a transition to PS_WA_Name. The next token is = causing a transition to state PS_W_Name. The next token is the string My Disk (tokenizer removes surrounding quotes in this example) causing a transition to state PS_Settings_2 and an action to set diskName=My Disk. The next token indicates the end of the token stream corresponding to LX_End causing a transition to the Final state. Parsing of the input stream is complete and the resulting IR may be returned to a caller or routine which performed an invocation to perform parsing.

The foregoing traversal illustrates processing that may be performed by parser code for the first syntax where the parser code corresponds to the FSM diagram and is generated using the techniques herein such as, for example, illustrated in connection with FIGS. 2 and 3.

Referring to FIGS. 6A and 6B, shown is an example 500, 550 of an FSM diagram representing the second syntax for a create command. The following represents the mapping between tokens and transition guards for the second syntax:

| Transition Guard | Command line token |
|---|---|
| LX_Create | create |
| LX_disk | disk |
| LX_Settings | settings |
| LX_Name | name |
| LX_Type | type |
| LX_Size | size |
| LX_Assignment | = |

-continued

| Transition Guard | Command line token |
| --- | --- |
| LX_Comma | , |
| LX_End | signals end of input |

As described in connection with FIG. 5, a command line may be entered and parsed in accordance with the second syntax.

Referring to FIG. 7, shown is an example 580 of an FSM diagram representing the third syntax for a create command. The following represents the mapping between tokens and transition guards for the third syntax:

| Transition Guard | Command line token |
| --- | --- |
| LX_NewDisk | newdisk |
| LX_Name | -name |
| LX_Type | -type |
| LX_Size | -size |
| LX_End | signals end of input |

As described in connection with FIG. 5, a command line may be entered and parsed in accordance with the third syntax.

Figure 8:
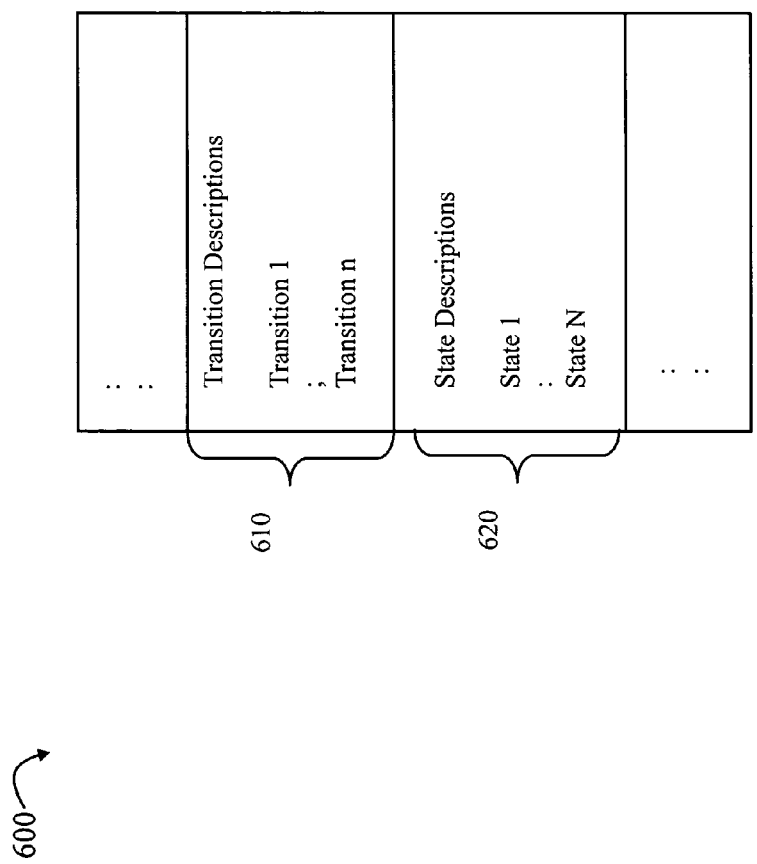
FIG. 8 is an example representation of information that may be included in an XML file representing an FSM diagram in an embodiment using the techniques herein.

Referring to FIG. 8, shown is an example representing a general format of information that may be included in an XML or other file representing the FSM diagram. The example 600 represents a format of the XML file that may be automatically generated, for example, from the UML model using a modeling tool. With reference back to FIG. 2, the example 600 may represent a format of the XML file 106 generated by the tool 104 corresponding to the FMS diagram or graphical representation 102 in accordance with a modeling language, such as UML. The XML file may include a portion 610 with transition descriptions and a portion 620 with state descriptions. The transition descriptions 610 may describe each transition graphically represented in the FSM diagram. The transition descriptions 610 may describe graphical or visual aspects of how a transition is represented based on line color, thickness, direction of an arrow representing the transition, and the like. The descriptions 610 may also describe which other graphical elements correspond to source and target states for each transition. The state descriptions 620 may similarly describe each state represented in the FSM diagram. The state descriptions may describe graphical or visual aspects of how each state is represented. The XML file format may also include other portions preceding and/or following the portions 610 and 620.

Referring to FIG. 9, shown is an example of a portion of information that may be included in the XML file describing a transition. With reference to the FSM diagram of FIG. 5, the example 700 includes a portion of the XML that may be included in the transition descriptions for a transition from state PS_Start to state Error as denoted by element 402 of FIG. 5. Elements 702a, 702b and 702c denote XML that describes the source state, PS_Start, for the transition, and elements 704a, 704b and 704c denote XML that describes the target state, Error, for the transition. The foregoing XML representation may include information regarding internally used identifiers for the source and target states. The foregoing identifiers may be internally used by the XML representation to reference XML elements corresponding to the states and to provide a textual description of the states, associated transitions, and the like, of the corresponding FSM diagram.

Referring to FIG. 10, shown is another example of a portion of information that may be included in the XML file describing a transition. With reference to the FSM diagram of FIG. 5, the example 800 includes a portion of the XML that may be included in the transition descriptions for a transition from state PS_Disk to state PS_DiskId as denoted by element 420 of FIG. 5. Elements 802a, 802b and 802c denote XML that describes the source state, PS_Disk, for the transition and elements 804a, 804b and 804c denote XML that describes the target state, PS_DiskId for the transition. The foregoing XML representation may include identifiers for the source and target states. Such identifiers may be referenced elsewhere in the XML in representing and describing the FSM diagram textually in XML. Element 810 denotes information included in the XML for the corresponding action to store information in the IR.

Referring to FIG. 11, shown is an example illustrating a portion of information that may be included in the XML file describing states. With reference to the FSM diagram of FIG. 5, the example 900 includes a portion of the XML that may be included in the state descriptions for one of the various error states and the state PS_DiskId as denoted by element 410 of FIG. 5. Element 1102 represents information that may be included describing one of the pseudo error states. Element 1104 represents a portion of encoded information describing visual aspects of the state as graphically represented. Element 1110 represents information that may be included describing the state PS_DiskID. Element 1106 denotes one of the identifiers (value of 52) as previously included in 804c of FIG. 10 when describing the transition of FIG. 10.

The foregoing XML representation portions included in FIGS. 9, 10, and 11 are examples of XML that may be automatically generated such as using the modeling tool. The generated XML may include information for the various graphical elements of the FSM diagram described where the graphical elements may correspond to various states and transitions. A particular modeling tool or other software may be used to generate an XML representation that may differ from that as described herein. The foregoing tools may also generate a representation other than one using XML where the representation describes the FSM diagram and where the representation has a form that may be understood and processed as an input by a parser code generator such as, for example, described in connection with FIGS. 2 and 3.

An embodiment of the parser code generator may generate code by processing the XML representation of the FSM diagram. The parser code generator may process the XML representation using any one of a variety of different code generation techniques to generate parser code. As described elsewhere herein, the parser code generated may be source code. The source code may have a format and include language elements that vary in accordance with the particular language selected. In one embodiment, the code generator may generate parser code that is in the C++ source language. It will be appreciated by those skilled in the art that the code generator may generate code for any one of a variety of different source code languages. More generally, as also described elsewhere herein, the code generator may also generate parser code in a form other than a source code file.

Figure 12:
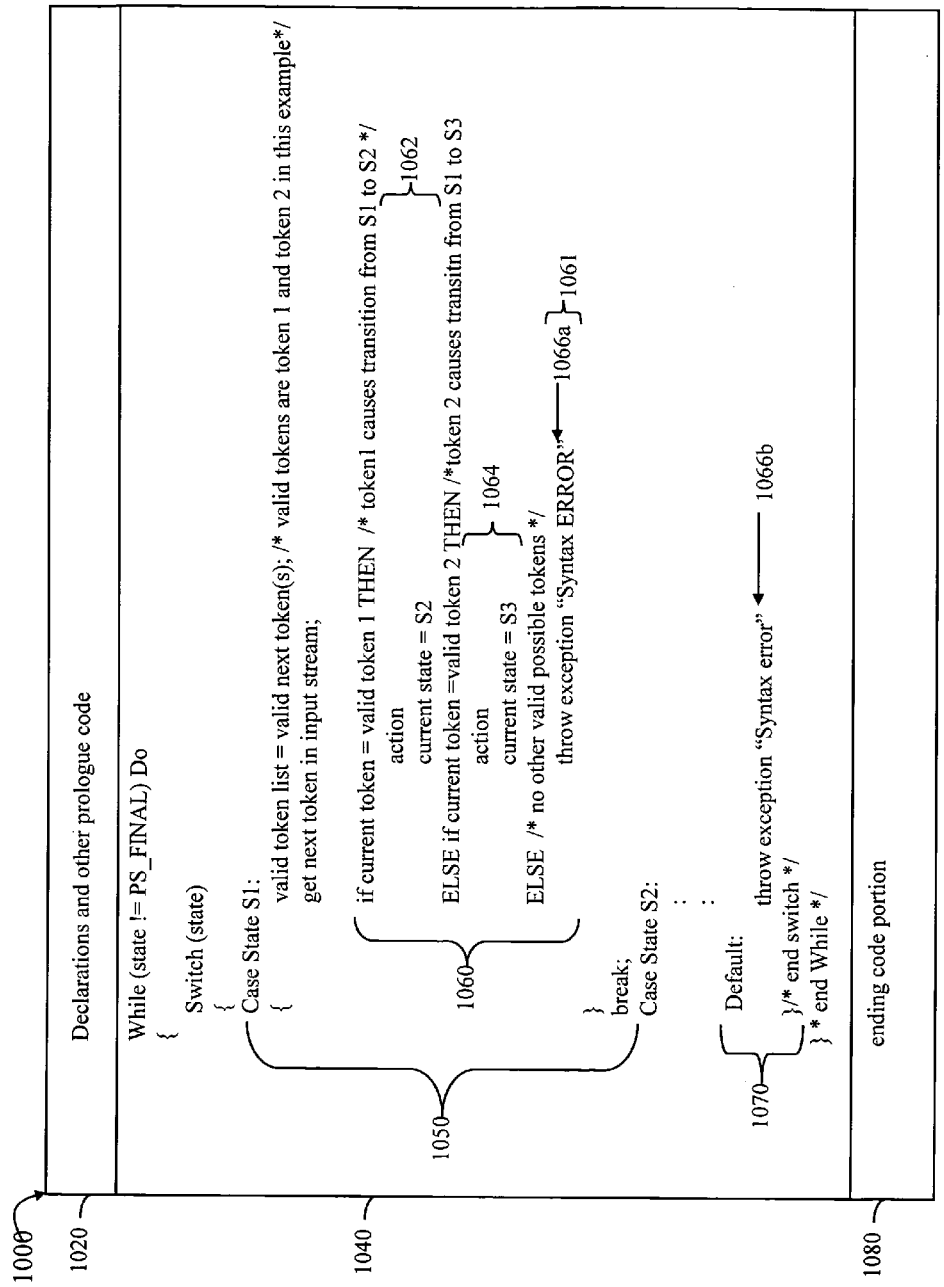
FIG. 12 is an example representing a file format of parser code generated in an embodiment using the techniques herein.

Referring to FIG. 12, shown is an example representation of a general format of code that may be generated using a parser code generator in an embodiment using the techniques herein. The example 1000 is one format of source language code that may be generated. The example 1000 is a pseudo-code C-like representation including a portion 1040, declarations and other prologue code 1020 preceding portion 1040, and an ending code portion 1080 that may follow code portion

1040. The code portion 1040 represents logic corresponding to the parsing of an input represented as a token stream in accordance with syntax that may have been previously represented using an FSM diagram in accordance with a modeling language using a modeling tool. The modeling tool or other software may be used to generate an XML or other representation capable of being processed as an input by the parser code generator to generate the parser code having format 1000. The syntax and logic used in connection with parsing an input may be encoded in portion 1040. One particular code generation algorithm will be described in following paragraphs which generates code having format 1000. The particular code generation algorithm generates code for a single module or routine so that top down parsing may be performed in an iterative fashion. Other code generation algorithms may output parser code which performs other top down parsing techniques as well as any one of a variety of bottom up parsing techniques. Top down parsing techniques may be characterized as performing parsing which attempts to find left-most derivations of an input-stream by searching for parse trees using a top-down expansion of grammar rules where tokens are consumed from left to right. Bottom up parsing techniques attempt to identify and build parse trees from the bottom upward toward the start symbol. Shift reduce parsing is one example of bottom up parsing. With bottom up parsing, rather than beginning with the starting symbol and generating an input string, the input is examined and processing attempts to work backward to the starting symbol.

In one embodiment of the parser code generator generating parser code having a format as illustrated in the example 1000, the XML representation, such as of FIG. 8, may be processed. Processing may be performed for each state in the XML representation from the initial or starting state to the final state. As a result of processing, parser code may be accordingly generated for the particular code generation algorithm used and the particular parsing technique performed by the generated parser code. The code generation algorithm may generally traverse the states represented in the XML or other form. As indicated in portion 1040 for one particular code generation algorithm used, the generated parser code may include a switch statement which switches on a variable corresponding to the current parsing state for a given input. Each state in the XML representation, excluding pseudo-state error states, may have a corresponding case in the switch statement. A code portion of a case for a given state (e.g., 1050) is executed when the current parsing state is the given state (e.g., S1). For each state represented as a case in the switch statement, a set of one or more tokens causing a state transition from a current parsing state may be determined using the XML transition descriptions. The set of tokens may represent the set of valid or acceptable next tokens for the current parsing state. All other tokens may cause a transition to an error state. Element 1050 represents generated code for a single state represented as a case of the switch statement. For each token within the set of valid tokens (e.g., valid token list in FIG. 12), a series of conditional statements, such as IF-Then-Else statements, may be generated where each possible token in the set has corresponding code which is performed when one of the THEN conditions evaluates to true. With reference to 1050, the set of valid tokens may include "token 1" and "token 2". Code portion 1062 is generated and indicates processing performed during parsing when token 1 is encountered when the current state is S1. Code portion 1064 is generated and indicates processing performed during parsing when token 2 is encountered when the current state is S1. Code portion 1061 is generated corresponding to a syntax error being detected and indicates processing performed during parsing when a token other than token 1 or token 2 is encountered and the current parsing state is S1. Code portion 1070 may be generated in connection with a default case for a parse state also corresponding to a syntax error condition. Code portions 1062 and 1064 generated for a given token in the set of valid tokens may include performing actions, if any, to update the IR, and advancing the current parse state to a next state, if needed. Code for each case 1050 may include an ELSE code portion, such as 1061, which represents an error state.

In one embodiment generating C++ source code as the generated parser code, C++ code may be generated which throws an exception as represented by elements 1066a and 1066b corresponding to processing performed when a syntax error has been determined. Exceptions may be generated by executing code when particular errors and/or abnormalities occur. Occurrence of an exception causes a transfer of control from the normal program flow to a handler or special routine. Different languages may include the appropriate language constructs to define the portion of code corresponding to the handler which is invoked when such exceptions occur during runtime. C++ supports the use of language constructs to separate the error handling and reporting code that is invoked upon the occurrence of an exception from other code portions. An exception may be characterized as being "thrown" at the runtime execution point in code where some error or abnormal condition is detected. The throwing of the exception causes the normal program flow to be aborted and causes a transfer of control to a designated block of code, often referred to as the handler described above or a "catch block", which encloses the point of throwing in terms of program execution. The catch block may be located in a different function than the code that caused the exception. In C++, along with altering the program flow, throwing of an exception passes an object to the catch block. This object can provide data which is necessary for the handling code to further process the exception or otherwise decide how to proceed in program execution, such as when a syntax error is encountered during parsing.

The generated parser code in this example includes the portion 1040. The portion 1040 includes an outer while loop and an inner switch statement. The switch statement includes a case for each possible state of the FSM as described above, excluding error states as represented, for example, using pseudo states in the FSM diagrams described herein. The switch statement also includes a default case 1070 which corresponds to an error state. For each case of the switch statement (other than case 1070), a list of valid tokens is determined and the tokenizer gets the next token from the input stream. For each valid token in the list for the case, code is generated which is performed during parsing when a condition represented by "current token=valid token" evaluates to true. For each case of the switch statement (other than case 1070), there is one ELSE condition (as denoted by 1061 representing an error condition) which evaluates to true during parsing when the current token is not one of the valid tokens. It should be noted that in connection with the switch statement, a case may be associated with a state having an unconditional transition where there may be no list of valid tokens causing a transition. As such, an unconditional transition does not consume or advance the token input stream. Rather, an unconditional transition may include code which transitions the state and performs any action, if needed. As an example, the state diagram of FIG. 5 includes an unconditional transition from state initial to PS_start.

The generated code may also include different, equivalent language elements for the particular source code language generated than as illustrated in FIG. 12. Rather than generate code which performs parsing in an iterative fashion as illustrated in FIG. 12, the code generator may also generate code which performs parsing in a recursive manner, for example, where code for cases of the switch statements may be embodied in separate routines that are invoked. For example, an embodiment may use a code generator which generates parser code that performs top down parsing using a recursive descent parsing technique.

Figure 13:
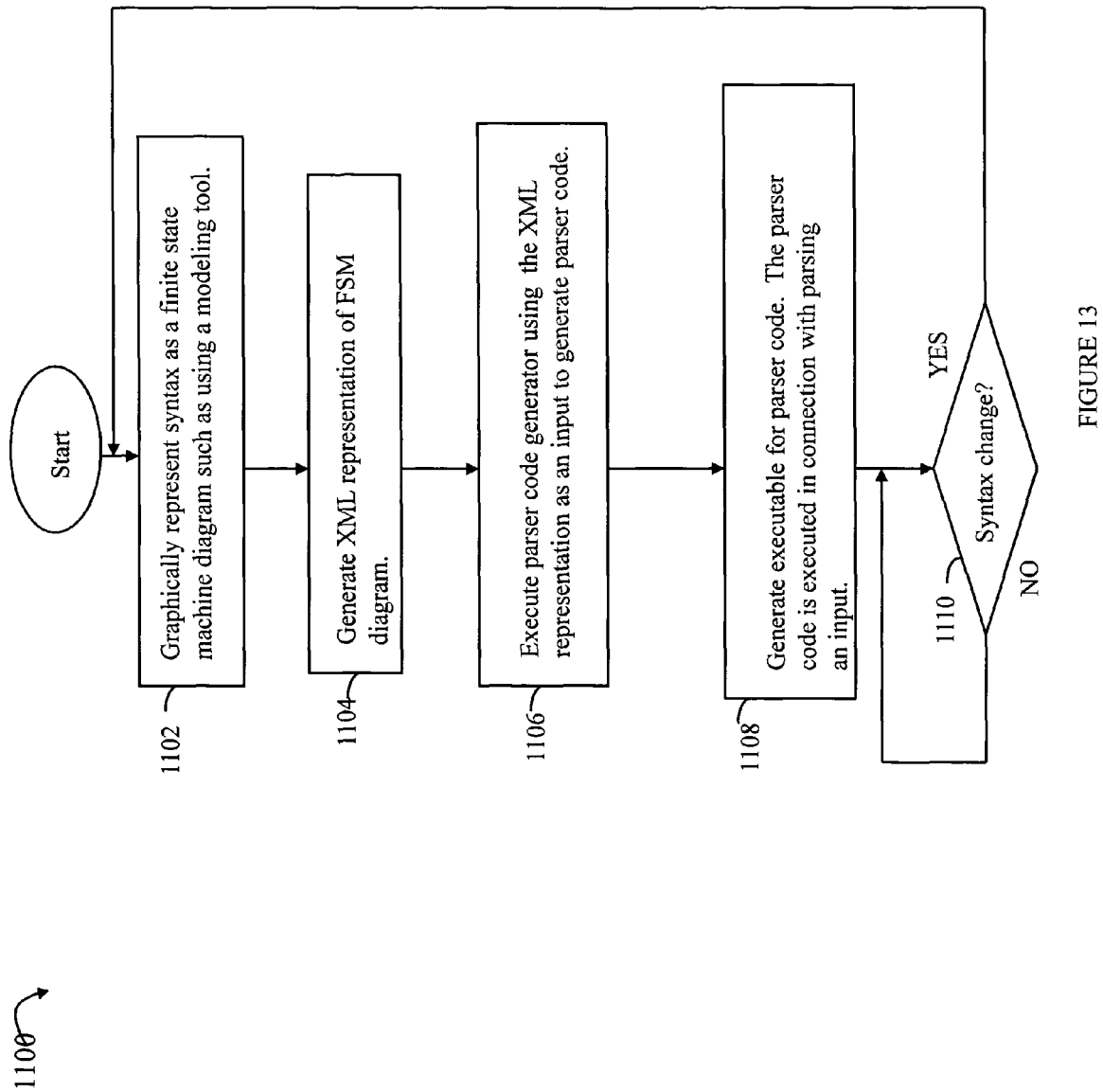
FIGS. 13, 14 and 16 are flowcharts of processing steps that may be performed in an embodiment using the techniques herein.

Referring to FIG. 13, shown is a flowchart of processing that may be performed in an embodiment in accordance with the techniques herein. The flowchart 1100 summarizes processing that may be performed as described, for example, in connection with FIG. 2. At step 1102, an input syntax, such as a command line syntax, may be represented as an FSM diagram or graphical representation. The diagram may be produced by manually interacting with a modeling tool to draw various graphical elements or components representing the FSM. In one embodiment, the modeling tool may represent the FSM as a diagram using a modeling language such as UML. At step 1104, the XML representation or other representation of the FSM diagram may be generated. Step 1104 may be performed using the modeling tool or other software which automatically generates another representation of the FSM diagram where the other representation can be processed as an input by the parser code generator. At step 1106, the parser code generator may be executed which uses the XML or other representation generated in step 1104 to produce parser code. The parser code produced as a result of step 1106 may be used in connection with parsing an input in accordance with the syntax graphically represented in step 1102. In step 1108, executable code for the parser is generated. The executable code may be run to perform processing and parse an input, such as a command line input. At a later point in time, there may be a change to the syntax. Such a change may be determined as represented in step 1110. If step 1110 determines that a syntax change has occurred, control may proceed to step 1102 where the modified syntax may be graphically represented, for example, by modifying an existing FSM diagram. Subsequent processing steps of flowchart 1100 may then be performed to generate new parser code for the new syntax. If step 1110 evaluates to no, no changes to the FSM diagram for the syntax are needed.

Figure 14:
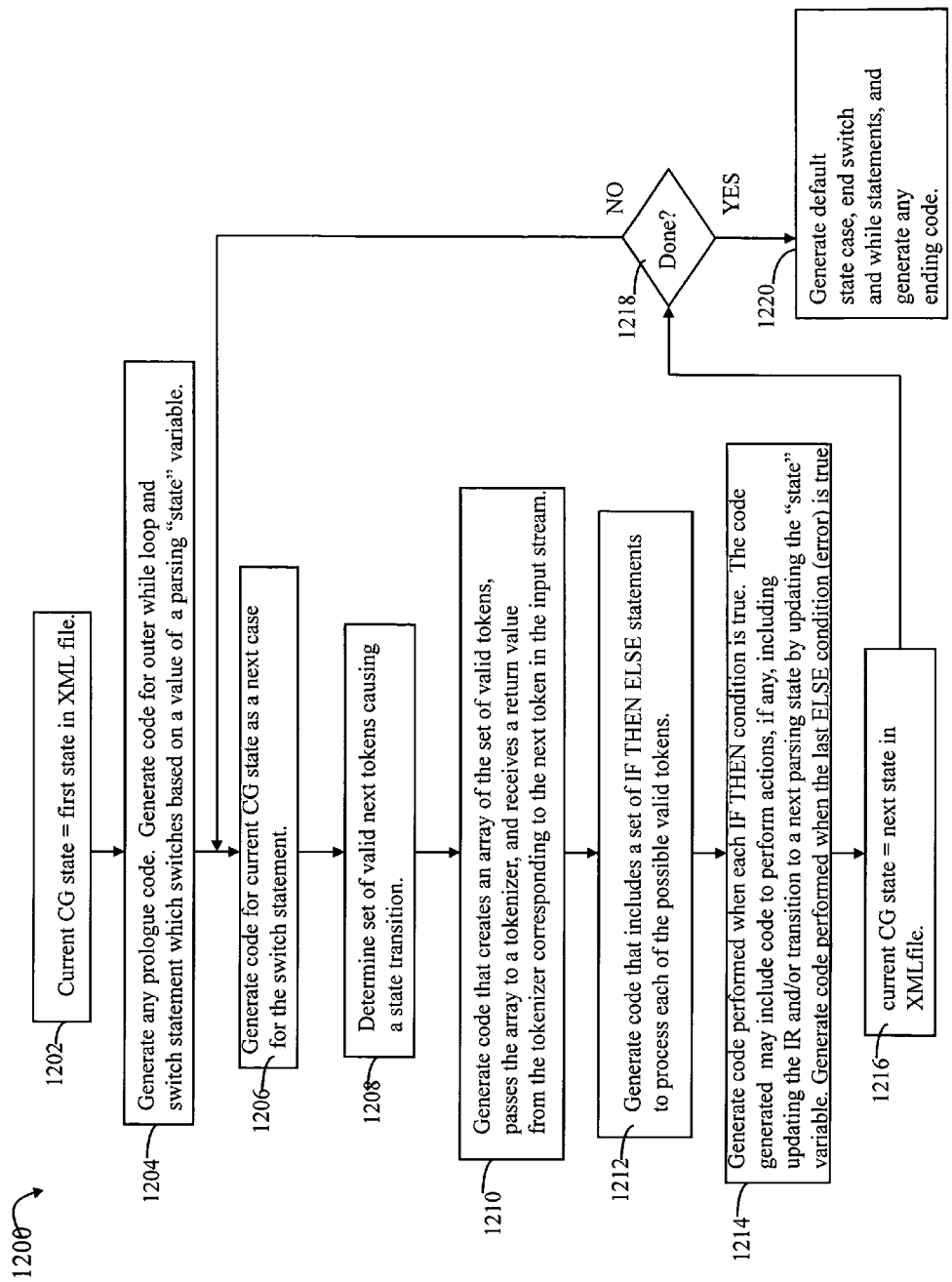

Referring to FIG. 14, shown is a flowchart of processing steps that may be performed in an embodiment by a parser code generator. The steps of flowchart 1200 summarize processing as described above in connection with generating a C++ code module for performing parsing where the generated parser code has a format generally represented in FIG. 12. An embodiment of the code generator may, for example, process the XML file to generate an internal representation of the FSM diagram prior to generating code. Alternatively, an embodiment of the code generator may generate parser code, or portions of parser code, while making one or more passes over the XML representation. The flowchart 1200 may process an XML file having a format and information as described in connection with FIG. 8. At step 1202, the current state for which code generation is performed may correspond to a first state in the XML file. The variable current CG (code generation) state in FIG. 14 may correspond to the state for which code generation is being performed. In one embodiment, this first state may be the initial state of the FSM. At step 1204, a prologue code portion, if any, may be generated. As part of step 1204, code for the outer while loop and switch statement may be generated where the switch statement switches based on a value of a parsing state variable for a current parsing state. In connection with the flowchart 1200, a variable in the generated parser code may represent the current parsing state. The current parsing state variable may be updated by generated code of each switch statement case as the parsing state is advanced in accordance with the transitions. At step 1206, code may be generated for the current CG state as a next case for the switch statement. Code generated for each current CG state processed corresponds to a code instance such as represented by element 1050 of FIG. 12. At step 1208, a set of valid next tokens causing a state transition from the current parsing state, when the current parsing state is the current CG state, is determined. At step 1210, code is generated that creates an array of the set of valid tokens, passes the array to a tokenizer, and receives a return value from the tokenizer corresponding to the next token in the input stream. At step 1212, code is generated that includes a set of IF THEN ELSE statements to process each of the possible valid tokens. The generated parser code includes a last ELSE condition corresponding to when the next token obtained for a current parsing state is not a valid token in the list. At step 1214, code is generated that is executed during parsing when each IF THEN condition evaluates to true for each valid token. With reference to FIG. 12, step 1214 includes generating code portions 1062 and 1064. The code generated for each IF THEN condition evaluating to true may include code to perform one or more actions, if any, and transitioning to the next parsing state. Code for the actions may include updating an IR. Code generated for transitioning to a next parsing state may include generating code which updates the current parsing state variable representing a current parsing state. Step 1214 also includes generating a code portion executed when the last ELSE condition evaluates to true (e.g., code portion 1061 of FIG. 12). Code generated for the ELSE condition corresponding to a syntax error state may throw an exception as previously described and illustrated. At step 1216, the current code generation (CG) state is advanced to the next state in the XML file. At step 1218, a determination is made as to whether all states in the FSM have been processed. If so, control proceeds to step 1220 to generate the default state case (at the end of the switch statement as represented by element 1070 of FIG. 12), end the switch and while statements (such as by generating appropriate code to indicate the close of the statements) and also generate any ending code. If step 1218 evaluates to no, control proceeds to step 1206 to process the current CG state.

Following is a more complete code example of C++ code that may be generated for the FSM diagram illustrated in FIG. 5 (syntax 1) using the code generation algorithm described in connection with FIG. 14. The following generated code has a general format of FIG. 12.

```
{                       /* PROLOGUE CODE of element 1020 of Figure 12 STARTS
                           HERE */
IR result;              /* Holds intermediate result */
enum ParseState         /* Include an enumeration of all parse states */
{
  PS_Create,
  PS_Disk,
```

```
    PS_DiskId,
    PS_Final,
    PS_Initial,
    PS_Settings_1,
    PS_Settings_2,
    PS_Start,
    PS_WA_Name,
    PS_WA_Size,
    PS_WA_Type,
    PS_W_Name,
    PS_W_Size,
    PS_W_Type
} state = PS_Initial;      /* initialize variable state to PS_Initial */
static const char* LX_Create = "create";      /* Define tokens */
static const char* LX_Disk = "disk";
static const char* LX_Settings = "settings";
static const char* LX_Name = "name";
static const char* LX_Type = "type";
static const char* LX_Size = "size";
// Standard tokens
static const char* LX_Assignment = "=";
static const char* LX_Comma = ",";
std::string entity;
std::string action;
                              /* PROLOGUE CODE ENDS HERE*/
                              /* CODE GENERATED CORRESPONDING TO Element 1040
                                 begins here */
while ( state != PS_Final )      /* Parse by looping through states based on input
                                    until final parse state PS_Final is reached */
{
   switch ( state )              /* Switch on current parse state */
   {
      case PS_Create              /* code generated for a single case as represented by 1050
                                     of Figure 12 starts here */
      {
         static std::string keyWords[ ] = { LX_Disk };   /* Next Possible valid tokens */
         static size_t size = sizeof( keywords ) / sizeof( keyWords[0] );
         const size_t idx = tokenizer.next( keyWords, size );   /* get next token in input stream* /
         if ( idx == 0 ) // LX_Disk      /* if next token is LX_Disk */
         {
            IR_ADD( "entity", "disk" ); /* Perform action to update the IR */
            entity = "disk";
            state = PS_Disk;         /* set the next state */
         } else                      /* if any other token is next generate error
                                        This corresponds to a code portion for element 1061 of
                                        Figure 12*/
         {
            throw CLIException( CLIException::ERR_Syntax, "Unsupported entity name is
specified", entity.c_str( ), action.c_str( ) );
         }
      }
      break;                        /* code ending a single state for portion 1050 of Figure 12
                                        ends here */
      case PS_Disk
      {
         const size_t idx = tokenizer.next( 0, 0 );      /* get next token */
         if ( idx == 0 ) // LX_String         /* next token is a string */
         {
            IR_ADD( "diskId", tokenizer.value( ) );      /* perform action and update IR*/
            state = PS_DiskId;   /* set next state */
         } else      /* if any other token is next generate error */
         {
            throw CLIException( CLIException::ERR_Syntax, "Disk ID must go after create
keyword", entity.c_str( ), action.c_str( ) );
         }
      }
      break;
      case PS_DiskId
      {
         static std::string keyWords[ ] = { LX_Settings }; /* next possible valid tokens */
         static size_t size = sizeof( keyWords ) / sizeof( keyWords[0] );
         const size_t idx = tokenizer.next( keyWords, size ); /* get next token in input
                                                                  stream */
         if ( idx == 0 ) // LX_Settings /* if token is LX_Settings */
         {
            state = PS_Settings_1;         /* set next state */
         } else if ( idx == Tokenizer::LX_End ) // LX_End /* If token is LX_End */
         {
            state = PS_Final;         /* set next state */
         } else               /* generate error for any other next token */
```

-continued

```
        {
            throw CLIException( CLIException::ERR_Syntax, "Only settings keywork may go after
disk ID", entity.c_str( ), action.c_str( ) );
        }
    }
    break;
    case PS_Initial
    {
        state = PS_ Start;   /* set state */
    }
    break;
    case PS_Settings_1
    {
        static std::string keyWords[ ] = { LX_Name, LX_Type, LX_Size }; /* valid next
                                                                    tokens */
        static size_t size = sizeof( keyWords ) / sizeof( keyWords[0] );
        const size_t idx = tokenizer.next( keyWords, size ); /* get next token in input */
        if ( idx == 0 ) // LX_Name         /* if next token is LX_Name */
        {
            state = PS_ WA Name;           /* set state */
        } else if ( idx == 1 ) // LX_Type     /* if next token is LX_Type */
        {
            state = PS_WA_Type;            /* set state */
        } else if ( idx == 2 ) // LX_Size    /* if next token is LX_size */
        {
            state = PS_WA_Size;
        } else             /* generate error if any other next token */
        {
            throw CLIException( CLIException::ERR_Syntax, "Setting name should go after settings
keyword", entity.c_str( ), action.c_str( ) );
        }
    }
    break;
    case PS_Settings_2
    {
        static std::string keyWords[ ] = { LX_Name, LX_Size, LX_Type }; /* next valid tokens */
        static size_t size = sizeof( keyWords ) / sizeof( keyWords[0] );
        const size_t idx = tokenizer.next( keyWords, size ); /* get next input token */
        if ( idx == Tokenizer::LX_End ) // LX_End /* if next token is LX_End */
        {
            state = PS_Final;              /* set state */
        } else if ( idx == 0 ) // LX Name    /* if next token is LX_Name */
        {
            state = PS _WA_Name;           /* set state */
        } else if ( idx == 1) // LX_Size    /* if next token is LX_Size */
        {
            state = PS _WA_Size;           /* set state */
        } else if ( idx == 2 ) // LX_Type    /* if next token is LX_type */
        {
            state = PS_WA_Type;            /* set state */
        } else             /* generate error if next token is any other */
        {
            throw CLIException( CLIException::ERR_Syntax, "Bad command line syntax",
entity.c_str( ), action.c_str( ) );
        }
    }
    break;
    case PS_Start
    {
        static std::string keyWords[ ] = { LX_Create }; /* next valid token */
        static size_t size = sizeof( keyWords ) / sizeof( keyWords[0] );
        const size_t idx = tokenizer.next( keyWords, size ); /* get next token */
        if ( idx == 0 ) // LX_Create /* if next token is LX_Create */
        {
            IR_ADD( "action", "create" );   /* perform action */
            action = "create";
            state = PS_Create;            /* set state */
        } else           /* generate error if any other token */
        {
            throw CLIException( CLIException::ERR_Syntax, "Unsupported action name is
specified", entity.c_str( ), action.c_str( ) );
        }
    }
    break;
    case PS_WA_Name
    {
        static std::string keyWords[ ] = { LX_Assignment };/* next valid token */
        static size_t size = sizeof( keyWords ) / sizeof( keyWords[0] );
        const size_t idx = tokenizer.next( keyWords, size );/* get next token */
        if ( idx == 0 ) // LX_Assignment /* if next token is LX_Assignment */
```

```
        {
            state = PS_W_Name; /* set state */
        } else /* generate error if any other token is next in input stream */
        {
            throw CLIException( CLIException::ERR_Syntax, "The syntax is name=<disk name>",
entity.c_str( ), action.c_str( ) );
        }
    }
    break;
    case PS_WA_Size
    {
        static std::string keyWords[ ] = { LX_Assignment }; /* valid next tokens */
        static size_t size = sizeof( keyWords ) / sizeof( keyWords[0] );
        const size_t idx = tokenizer.next( keyWords, size ); /* get next input token */
        if ( idx == 0 ) // LX_Assignment /* if token is LX_Assignment */
        {
            state = PS_W_Size; /*set state */
        } else /* generate error if any other token is next in input stream */
        {
            throw CLIException( CLIException::ERR_Syntax, "The syntax is size=<disk size>",
entity.c_str( ), action.c_str( ) );
        }
    }
    break;
    case PS_WA_Type
    {
        static std::string keyWords[ ] = { LX_Assignment }; /* next valid token */
        static size_t size = sizeof( keyWords ) / sizeof( keyWords[0] );
        const size_t idx = tokenizer.next( keyWords, size ); /* get next token */
        if ( idx == 0 ) // LX_Assignment /* if next token is LX_Assignment */
        {
            state = PS_W_Type; /* set state */
        } else /*generate error if any other token is next in input stream */
        {
            throw CLIException( CLIException::ERR_Syntax, "The syntax is type=<disk type>",
entity.c_str( ), action.c_str( ) );
        }
    }
    break;
    case PS_W_Name
    {
        const size_t idx = tokenizer.next( 0, 0 ); /* get next token */
        if ( idx == 0 ) // LX_ String /* if next token is string */
        {
            IR_ADD( "diskName", tokenizer.value( ) ); /* perform action */
            state = PS_Settings_2; /* set state */
        } else/* generate error if any other token is next in input stream */
        {
            throw CLIException( CLIException::ERR_Syntax, "The syntax is name=<disk name>",
entity.c_str( ), action.c_str( ) );
        }
    }
    break;
    case PS_W_Size
    {
        const size_t idx = tokenizer.next( 0, 0 ); /* get next token */
        if ( idx == 0 ) // LX_ String /* if next token is LX_String */
        {
            IR_ADD( "diskSize", tokenizer.value( ) ); /* perform action */
            state = PS_Settings_2; /* set state */
        } else /* generate error if any other token is next in input stream */
        {
            throw CLIException( CLIException::ERR_Syntax, "The syntax is size=<disk size>",
entity.c_str( ), action.c_str( ) );
        }
    }
    break;
    case PS_W_Type
    {
        const size_t idx = tokenizer.next( 0, 0 ); /* get next input token */
        if ( idx == 0 ) // LX_String /* if token is LX_string */
        {
            IR_ADD( "diskType", tokenizer.value( ) ); /* perform action */
            state = PS_Settings_2;            /*set state */
        } else /* generate error if any other token is next in input stream */
        {
            throw CLIException( CLIException::ERR_Syntax, "The syntax is type=<disk type>",
entity.c_str( ), action.c_str( ) );
        }
    }
```

-continued
```
    break;
    default:     /* code portion corresponding to element 1070 of Figure 12*/
        {
            throw CLIException( CLIException::ERR_Syntax, "Bad command line syntax",
entity.c_str( ), action.c_str( ) );
        }
      }
    }
  } /* CODE GENERATED CORRESPONDING TO Element 1040
                        ends here */
  return result;
}
```

In connection with producing an FSM diagram or graphical illustration, such as when using the modeling tool described above, additional code may be used to further automate the generation of appropriate portions of the FSM diagram. In one embodiment using the modeling tool, the additional code may be characterized as an extension of the functionality of the modeling tool. The extension may perform additional processing embodied in the form of additional code that interacts with the modeling tool to extend the capabilities and functionality provided by the modeling tool or other application used to draw the FSM diagram for the input syntax. Portions of the FSM diagram may be generated in a more automated fashion when those portions form a template or pattern such as with a list of elements. For example, referring to FIG. 5 for the first syntax (syntax 1), graphical elements representing the states and transitions for a space-separated list may correspond to states PS_Settings_1, PS_WA_Name, PS_W_Name, PS_WA_Type, PS_W_Type, PS_WA_Size, PS_W_Size and PS_Settings_2 and associated transitions. The foregoing states and associated transitions of FIG. 5 represent a space separated list of <setting>=<name> pairs having an undefined order. In the foregoing example, the list may include one or more of the following pairs appearing in any order: a first pair of the list for a name corresponding to states (PS_WA_Name, PS_W_Name), a second pair of the list for a type corresponding to state (PS_WA_Type, PS_W_Type) and a third pair of the list for a size corresponding to states (PS_WA_Size, PS_W_Size). Code may be utilized which facilitates generating additional space separated lists having one or more different pairs. The foregoing states and transitions of FIG. 5 representing the space separated list may be used as a template to generate graphical elements in the FSM diagram for other space separated lists of pairs.

As described above, the first syntax represents the following syntax for a list of settings:
  settings <setting list>
where "settings" is a keyword and "<setting list>" is a space separated list of one or more pairs, each pair having a general form of "name=string" where name can be one of type, size or name. A template may be defined based on the foregoing where a keyword other than "settings" can be specified, and an instance of a "name" can be supplied for each pair in the associated list.

A user may, for example, make a menu selection for the foregoing space separated list template to generate a graphical representation for a space separated list, enter text inputs used to perform substitutions in a template for a space separated list, and then generate the corresponding graphical elements for the new space separated list in the FSM diagram. A user may enter, for example, a keyword (which is substituted in the template for the "settings" keyword), and a "name" for each pair of settings in the setting list. For example, a user may be generating an FSM diagram where a portion of the syntax includes a list of physical attributes of a person including height, weight and age. The syntax for the physical attributes included in a space separated list may be entered on a command line as follows:
  physical_attributes   height=string   weight=string age=string
where the list of attributes can be specified in any order as described in connection with syntax 1. In accordance with selecting an option for the space separated list template, a user may be prompted and may enter "physical_attributes" as the keyword and "height", "weight" and "age" for each of the possible element pairs of the physical attributes list. Once the foregoing inputs have been received, code may be executed to automatically generate the states and associated transitions for the template at a selected point in the FSM diagram. In this example, the template may cause generation of the states for the space separated list in accordance with those of FIG. 5.

Figure 15:
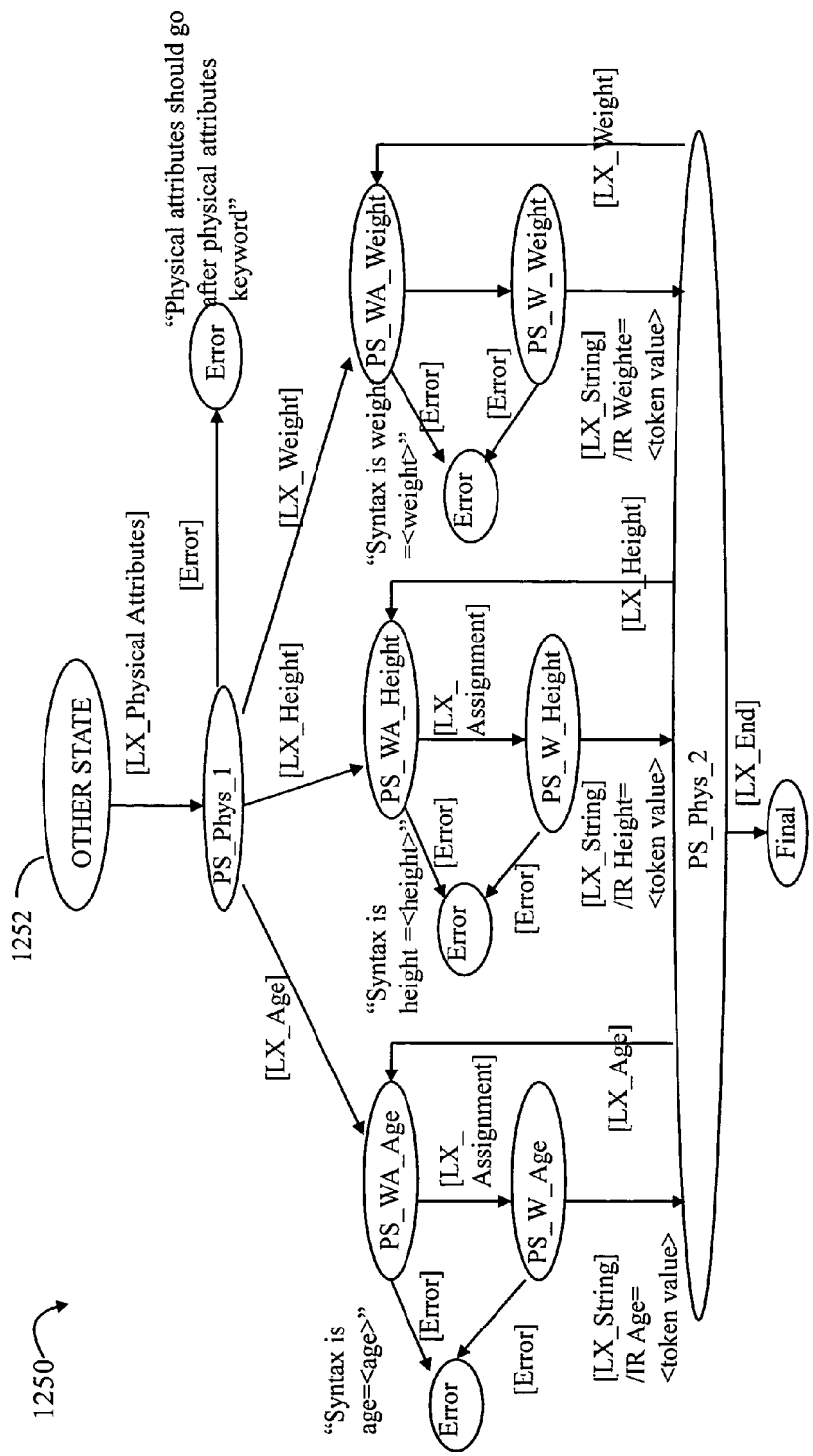
FIG. 15 is an example representing portions of an FSM diagram that may be automatically generated in accordance with a template.

Referring to FIG. 15, shown is an example illustrating the elements of an FSM diagram that may be automatically generated using the template for a space separated list described above. The example 1250 includes other state 1252 which is denoted as a point of insertion or connection for the space separated list. Element 1252 may correspond to a state included in another portion of an existing FSM diagram. The remaining elements of the example 1250 may be generated as a result of using the template for the space separated list described above for generating a list of physical attributes. In this example, the template is used to generate graphical elements of the FSM diagram where the list includes possible 3 physical attributes. The same template may also be used in connection with automatically generating portions of the FSM diagram when the list includes a different number of attributes.

Code may also be used to facilitate automated generation of graphical elements included in an FSM diagram for other list syntaxes such as, for example, a comma-separated, order dependent list as illustrated in FIGS. 6A and 6B, or another list syntax as illustrated in FIG. 7. In connection with FIGS. 6A and 6B, a template for an order dependent, comma separated list may be defined which automatically generates the states PS Name, PS_WA_Name, PS_W_Name, PS_WC_Name, PS_Type, PW_WA_Type, PS_W_Type, PS_WC_Type, PS_Size, PS_WA_Size, PS_W_Size and associated transitions given inputs denoting a keyword="settings", and list elements for "type", "name" and "size". In connection with FIG. 7, a template for another syntax for a space separated list may be defined which automatically generates the states PS_W_Name, PS_W_Type, PS_W_size and PS_Settings, and associated PS_Settings, transitions given inputs denoting a keyword="settings", and list elements for "type", "name" and "size". In a manner similar to using templates as described above and illustrated in FIG. 15, templates may be used to automatically generate graphical elements corresponding to other types of lists such as illustrated in FIGS. 6A, 6B and 7.

The foregoing are some examples of patterns that may be used in connection with code to generate graphical elements for the FSM in accordance with a template. It will be appreciated by those skilled in the art that a template may be easily extended and used in connection with other patterns and other entities besides a list of settings to automate the generation of FSM diagram elements for portions of an input syntax. Furthermore, an embodiment may provide for modifying an existing template to produce another template. For example, a first template may be defined which is used for generating a comma separated list in accordance with the syntax of FIGS. 6A and 6B. A second template may be defined from the first template where the second template uses a different separator than the comma. The second template may be specified as a variation of the existing first template.

Figure 16:
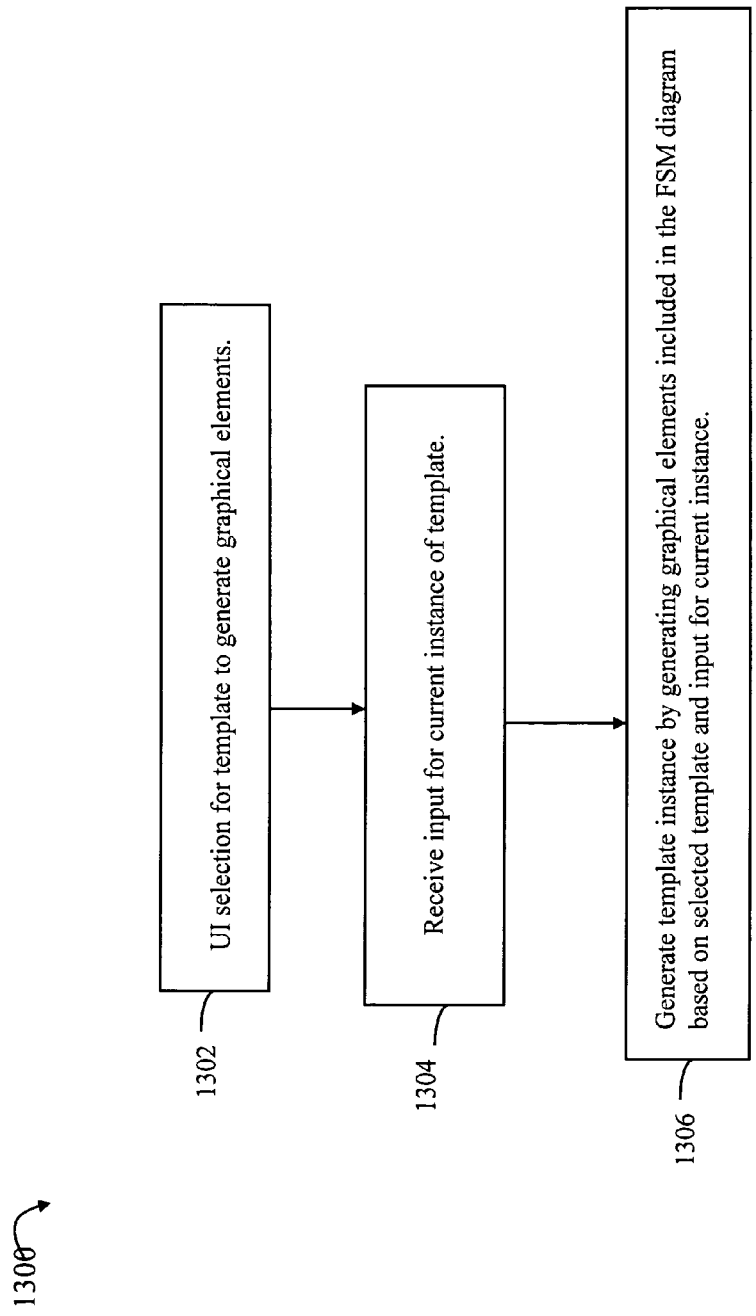

Referring to FIG. 16, shown is a flowchart of processing steps that may be performed in an embodiment in connection with facilitating automated generation of portions of the FSM diagram in accordance with a template. The flowchart 1300 summarizing processing as just described above as may be performed in an embodiment by executing code which, for example, extends a set of functionality of a modeling tool. At step 1302 a user may make a user interface (UI) selection to select a template used to generate graphical elements of the FSM diagram. The template selected be one of multiple templates which generate graphical elements for a particular template or pattern without having the user manually draw each element in the FSM diagram associated with the template or pattern. At step 1304, one or more inputs are received for a current instance of the template to be generated. In step 1306, a template instance is generated using the inputs from step 1304. The template instance generated may include generating graphical elements in the FSM diagram based on the selected template (selected in step 1302) and the inputs (from step 1304) for the current instance. As an example, an embodiment may include code of a first template for a space separated list (as represented using appropriate corresponding graphical elements of FIG. 5) and a second template for a comma separated, order dependent list (as represented using appropriate corresponding graphical elements of FIGS. 6A and 6B). The desired one of the first and second templates may be selected in step 1302. If, for example, the second template is selected for an order dependent, comma separated list, a user may enter, as part of step 1304 processing, a keyword and one or more names, where each name is used for a "name=string" list element in the list. Once the inputs have been received, the corresponding graphical elements in the FSM diagram for the list as described may be generated.

Templates may be characterized as denoting patterns for which graphical elements of an FSM diagram are generated in an automated fashion. The template may include one or more parameters for which the user may provide text inputs. The parameter values may be substituted in the template for the particular parameters in order to generate the corresponding graphical elements. As an example, syntax 1 for the space separated list illustrated in FIG. 15 may be parameterized as follows:

keyword=parameter 1
name 1=parameter 2/*list elements
:
name n=parameter n+1 where a user may be prompted to enter a value for each parameter on the right hand side of the "=". The parameter values are used or substituted for elements indicated on the left side of the "=" when using the template to generate corresponding graphical elements of the FSM diagram. In this example, the list may include one or more elements so the user may input 2 or more parameter values in accordance with the number of possible list elements.

Techniques are described herein for automatically generating parser code for parsing an input, such as a command line. The syntax for the input may be represented as a regular grammar and thus, represented as an FSM diagram in a graphical form. The FSM diagram may represent elements therein in accordance with a modeling language such as UML. The FSM diagram may be drawn using a modeling tool. The tool or other software may transform the FSM diagram into another form or representation that is able to be processed by a parser code generator. In one embodiment, a UML model for the FSM diagram of the input syntax may be transformed automatically by the modeling tool into an XML representation. An embodiment may also transform the UML model or other graphical representation of the FSM diagram into another format capable of being processed as an input by the parser code generator. For example, the UML model may be transformed into a state transition table, one or more rules, and the like. UML is a standard way of graphically representing an FSM for the input syntax using a diagram. XML corresponds to a textual equivalent representation of the UML for the FSM diagram. Graphical elements of the UML representation may be mapped to corresponding XML textual elements. The XML representation is a one form that can be processed by a parser code generator to generate parser code. The techniques herein allow a user to initially express an input syntax, such as for a CLI, which can be represented using a regular grammar and thus, using an FSM diagram. Expressing the grammar in a graphical form of the FSM diagram provides an advantage in that the user does not have to express the grammar as a formal set of rules with a particular format such as may be required when using other parser code generators. Using the techniques herein, if there is a change to the grammar syntax, a user can accordingly modify the graphical representation of the FSM diagram, automatically generate the XML file representing the FSM with the tool, and then, using the XML file with a parser code generator, automatically generate updated parser code for the new syntax. The updated XML file can be transmitted, such as to the data storage system, where the parser code can be generated. Thus, grammar/syntax updates may be communicated by transmitting the updated XML file and then generate the parser from the transmitted XML file representing the regular grammar. As described herein, XML is just one way in which the FSM diagram may be represented in a form for processing by the code generator.

A parser code generator may use other algorithms besides the particular code generation algorithm described, for example, in FIG. 14. More generally, other code generation algorithms may be used to generate a parser from the XML or other description representing the FSM. Both top down and bottom up parsers can be generated from the regular grammar as represented by the FSM and corresponding XML file. Therefore, an embodiment may accordingly use a parser code generation algorithm which generates parser code that performs top down or bottom up parsing so long as the code generator is able to process the XML or other input representing the FSM and corresponding regular grammar. Additionally, the code generation algorithm may generate parser code which is source code. The source code may be any one of a variety of different programming languages and may use a variety of different language constructs. The particular examples presented herein for purposes of illustration should not be construed as a limitation of the variety of different forms possible for the generated parser code.

As described herein, the input for which a syntax is represented using the techniques herein may be for one or more commands obtained using a CLI. Although the techniques herein may be used in connection with other types of interfaces, in some embodiments, it may be desirable to use a CLI to obtain commands rather than other possible interfaces. CLIs may be desirable, for example, for use in obtaining commands in an environment where other software components may not be currently available or executing such as may be used in connection with a graphical user interface (GUI) or other interface. For example, additional software for a GUI may not be executing when commands are obtained as part of a system boot. A CLI may also be used to communicate with a component that does not support complex features such as GUIs. A CLI may also be preferred over other interfaces to obtain a command, for example, where there is a large vocabulary of commands and a wide range of command options. Commands may be entered using a script and may be entered more rapidly than with other interfaces such as a GUI. Although the techniques herein may be used in connection with a CLI syntax, the techniques herein may be more generally used in connection with any input syntax.

In one embodiment in accordance with the techniques herein, the input syntax may be specified using the FSM diagram without having to first generate a formal expression of the syntax such as using syntax rules or in a particular format. The user may, for example, have a written description in the form of several paragraphs in a user manual describing the syntax. From this, the user may interact with a modeling tool or other application to draw a graphical representation of the syntax without first producing and providing another form of input to the tool or application for processing. Rather, the FSM diagram may be produced through user interactions to draw the FSM diagram with the modeling tool or other application.

An embodiment may implement the techniques herein using code executed by a computer processor. For example, an embodiment may implement the techniques herein using code which is executed by a processor of the data storage system and/or host. As will be appreciated by those skilled in the art, the code may be stored on the data storage system, host or other component on any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing an input comprising:
    providing a graphical representation of a finite state machine including states and transitions between said states representing a syntax used for determining whether the input is syntactically valid, said graphical representation of said finite state machine including elements representing said states and said transitions between said states;
    generating, from said graphical representation, a second representation corresponding to said graphical representation;
    generating, using said second representation, parser source code, wherein said generating the parser source code further includes:
        generating code for an outer processing loop and a switch statement included within the outer processing loop whereby the switch statement switches between different cases based on a value of a parsing state variable, each of the different cases corresponding to a different parsing state;
        for each of the different cases corresponding to a different parsing state included in the second representation, performing first processing to generate code for the different parsing state as a case of the switch statement, said first processing including:
            determining a set of valid next tokens causing a state transition from the different parsing state;
            generating code to process each of the valid next tokens in the set; and
            determining a next parsing state included in the second representation for which said first processing is performed; and
        generating code for a default case of the switch statement corresponding to an error state;
    processing the parser source code to generate parser executable code for a parser used for parsing the input to determine its syntactic validity in accordance with said syntax, wherein processing the parser source code includes compiling the parser source code;
    parsing the input using the parser, wherein said parsing includes executing the parser executable code for the parser generated from the parser source code;
    responsive to said parsing and the input being syntactically correct, generating an intermediate representation of the input, and
    wherein said syntax is a first of a plurality of syntaxes, said parser is one of a plurality of parsers, a command is expressed in a plurality of different representations corresponding to said plurality of syntaxes, said input is one of the plurality of different representations of said command, and wherein each of said plurality of parsers parses one of the plurality of different representations of the command and generates a same intermediate representation that is said intermediate representation.

2. The method of claim 1, wherein said graphical representation is a diagram formed from a unified modeling language including a set of graphical notation techniques specifying how to graphically represent elements of said finite state machine in said graphical representation.

3. The method of claim 1, wherein said second representation is a textual representation formed using a markup language.

4. The method of claim 1, wherein said graphical representation is drawn using a modeling tool.

5. The method of claim 4, wherein said modeling tool automatically generates said second representation as a textual representation.

6. The method of claim 5, wherein said textual representation is in XML (extended markup language) and said graphical representation is represented using a standardized unified modeling language.

7. The method of claim 1, wherein said graphical representation includes elements representing first states of said finite state machine, said first states corresponding to parsing states when parsing an input.

8. The method of claim 7, wherein said graphical representation includes elements corresponding to expected tokens causing state transitions.

9. The method of claim 1, wherein said finite state machine has transition rules represented in said graphical representation that correspond to production rules of a grammar for said syntax, and wherein said finite state machine has states represented in said graphical representation that correspond to non terminals of the grammar.

10. The method of claim 1, wherein said finite state machine is a deterministic finite state machine representing a regular grammar for syntax of a command line, and said parser parses a command line obtained using a command line interface.

11. The method of claim 3, wherein said textual representation includes a transition table.

12. The method of claim 3, wherein said textual representation includes one or more syntax rules.

13. A method of processing an input command comprising:
    modeling a command line interface syntax as a finite state machine diagram, said finite state machine diagram being a graphical representation of a finite state machine including states and transitions between said states representing the command line interface syntax, said graphical representation including elements representing said states and said transitions between said states;
    generating, from said finite state machine diagram, a textual representation of the command line interface syntax corresponding to said finite state machine diagram;
    generating, using said textual representation, parser source code, wherein said generating the parser source code further includes:
        generating code for an outer processing loop and a switch statement included within the outer processing loop whereby the switch statement switches between different cases based on a value of a parsing state variable, each of the different cases corresponding to a different parsing state;
        for each of the different cases corresponding to a different parsing state included in the textual representation, performing first processing to generate code for the different parsing state as a case of the switch statement, said first processing including:
            determining a set of valid next tokens causing a state transition from the different parsing state;
            generating code to process each of the valid next tokens in the set; and
            determining a next parsing state included in the textual representation for which said first processing is performed; and
        generating code for a default case of the switch statement corresponding to an error state;
    processing the parser source code to generate parser executable code for a parser used for parsing the input command to determine whether the input command is syntactically valid in accordance with said command line interface syntax, wherein said processing the parser source code includes compiling the parser source code;
    parsing the input command using the parser, wherein said parsing includes executing the parser executable code generated from the parser source code, wherein said parsing generates an intermediate representation of the input command if the input command is syntactically correct; and
    providing the intermediate representation to another code portion that performs processing to implement the input command, wherein said command line syntax is a first of a plurality of syntaxes, said parser is one of a plurality of parsers, a command is expressed in a plurality of different representations corresponding to said plurality of syntaxes, said input command is one of the plurality of different representations of said command, and wherein each of said plurality of parsers parses one of the plurality of different representations of the command and generates a same intermediate representation that is said intermediate representation.

14. The method of claim 13, wherein said command line interface syntax represents command syntax for data storage system commands, said textual representation is provided to a data storage system and said data storage system generates said parser executable code.

15. The method of claim 14, wherein a host connected to said data storage system requests from said data storage system an update to said command line interface syntax, and said data storage system sends a response including said textual representation.

16. The method of claim 13, wherein a grammar version identifier is associated with said textual representation of the command line interface syntax.

17. A non-transitory computer readable medium comprising executable code stored thereon for processing an input, the non-transitory computer readable medium comprising executable code stored thereon for:
    providing a graphical representation of a finite state machine including states and transitions between said states representing a syntax used for determining whether the input is syntactically valid, said graphical representation of said finite state machine including elements representing said states and said transitions between said states;
    generating, from said graphical representation, a second representation corresponding to said graphical representation;
    generating, using said second representation, parser source code, wherein said generating the parser source code further includes:
        generating code for an outer processing loop and a switch statement included within the outer processing loop whereby the switch statement switches between different cases based on a value of a parsing state variable, each of the different cases corresponding to a different parsing state;
        for each of the different cases corresponding to a different parsing state included in the second representation, performing first processing to generate code for the different parsing state as a case of the switch statement, said first processing including:
            determining a set of valid next tokens causing a state transition from the different parsing state;
            generating code to process each of the valid next tokens in the set; and
            determining a next parsing state included in the second representation for which said first processing is performed; and
        generating code for a default case of the switch statement corresponding to an error state;
    processing the parser source code to generate parser executable code for a parser used for parsing the input to determine its syntactic validity in accordance with said syntax, wherein processing the parser source code includes compiling the parser source code;

parsing the input using the parser, wherein said parsing includes executing the parser executable code for the parser generated from the parser source code;

responsive to said parsing and the input being syntactically correct, generating an intermediate representation of the input, and wherein said syntax is a first of a plurality of syntaxes, said parser is one of a plurality of parsers, a command is expressed in a plurality of different representations corresponding to said plurality of syntaxes, said input is one of the plurality of different representations of said command, and wherein each of said plurality of parsers parses one of the plurality of different representations of the command and generates a same intermediate representation that is said intermediate representation.

18. The non-transitory computer readable medium of claim 17, wherein the second representation is a textual representation including content written in accordance with a markup language, a modeling tool is used to draw the graphical representation, said modeling tool automatically generating the second representation.

19. The non-transitory computer readable medium of claim 17, wherein a portion of the graphical representation is automatically generated using a template based on one or more text inputs where elements in the graphical representation corresponding to the one or more text inputs are generated in accordance with the template.

20. The non-transitory computer readable medium of claim 19, wherein said template indicates that one or more corresponding states and associated transitions are automatically included in the graphical representation for the one or more text inputs.

* * * * *